United States Patent
Zhang et al.

(10) Patent No.: US 12,191,475 B2
(45) Date of Patent: Jan. 7, 2025

(54) ELECTRODE ASSEMBLY, SECONDARY BATTERY, BATTERY MODULE, BATTERY PACK AND ELECTRICAL DEVICE

(71) Applicant: CONTEMPORARY AMPEREX TECHNOLOGY (HONG KONG) LIMITED, Hong Kong (CN)

(72) Inventors: Tao Zhang, Ningde (CN); Jianfu He, Ningde (CN); Qian Liu, Ningde (CN); Xueyang Sun, Ningde (CN); Yonghuang Ye, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 240 days.

(21) Appl. No.: 17/933,855

(22) Filed: Sep. 21, 2022

(65) Prior Publication Data

US 2023/0112421 A1 Apr. 13, 2023

Related U.S. Application Data

(63) Continuation of application No. PCT/CN2021/123648, filed on Oct. 13, 2021.

(51) Int. Cl.
*H01M 4/13* (2010.01)
*H01M 4/02* (2006.01)

(52) U.S. Cl.
CPC ........ *H01M 4/13* (2013.01); *H01M 2004/021* (2013.01)

(58) Field of Classification Search
None
See application file for complete search history.

(56) References Cited

U.S. PATENT DOCUMENTS 10,559,843 B2 2/2020 Sasakawa et al.
2010/0310924 A1 12/2010 Kaneda et al.
(Continued)

FOREIGN PATENT DOCUMENTS

CN 101192682 A 6/2008
CN 102037584 A 4/2011
(Continued)

OTHER PUBLICATIONS

The extended European search report received in the corresponding European application 21930598.4, mailed Jul. 4, 2023.
(Continued)

*Primary Examiner* — Carlos Barcena
(74) *Attorney, Agent, or Firm* — Kilpatrick Townsend & Stockton LLP

(57) ABSTRACT

An electrode assembly, secondary battery, battery module, battery pack and electrical device are provided. In some embodiments, the electrode assembly comprises a positive electrode plate, a negative electrode plate and a separator disposed between the positive electrode plate and the negative electrode plate, the positive electrode plate satisfies $0<CAP1/CAP2<1$, in which CAP1 represents capacity of the first positive electrode film layer in Ah, CAP2 represents capacity of the second positive electrode film layer in Ah, and the electrode assembly satisfies $R_4/R_3 - R_2/R_1 \geq 0$, in which $R_1$ represents resistance of the first positive electrode film layer in $\Omega$, $R_2$ represents resistance of the second positive electrode film layer in $\Omega$, $R_3$ represents resistance of the first negative electrode film layer in $m\Omega$ and $R_4$ represents resistance of the second negative film layer in $m\Omega$. The present applicant may extend the cycle life of the secondary battery.

20 Claims, 7 Drawing Sheets

(56) References Cited

U.S. PATENT DOCUMENTS

| | | | |
|---|---|---|---|
| 2015/0086847 A1 | 3/2015 | Minagata | |
| 2015/0340732 A1* | 11/2015 | Kim | H01M 4/366 |
| | | | 429/246 |
| 2020/0313186 A1 | 10/2020 | Wang et al. | |
| 2022/0367878 A1 | 11/2022 | Zhang et al. | |

FOREIGN PATENT DOCUMENTS

| | | |
|---|---|---|
| CN | 102195096 A | 9/2011 |
| CN | 202996958 U | 6/2013 |
| CN | 104412438 A | 3/2015 |
| CN | 106252569 A | 12/2016 |
| CN | 106941150 A | 7/2017 |
| CN | 109273771 A | 1/2019 |
| CN | 111554878 A | 8/2020 |
| CN | 112864360 A | 5/2021 |
| CN | 112928334 A | 6/2021 |
| CN | 113036298 A | 6/2021 |
| EP | 3392891 A1 | 10/2018 |
| JP | 2010080427 A | 4/2010 |
| JP | 2014007107 A | 1/2014 |
| JP | 2014007108 A | 1/2014 |
| JP | 2017033824 A | 2/2017 |
| WO | 2021189424 A1 | 9/2021 |

OTHER PUBLICATIONS

International Search Report and Written Opinion received in International Application PCT/CN2021/123648 on Jul. 8, 2022.
Notice of Reasons for Refusal received in the corresponding Japanese application 2022-551417, mailed Dec. 4, 2023.
Communication pursuant to Article 94(3) EPC received in the corresponding European application 21930598.4, mailed on Aug. 8, 2024.
Request for the Submission of an Opinion received in the corresponding Korean application 10-2022-7029908, mailed on Aug. 9, 2024.
The extended European search report received in the corresponding European Application 21927051.9, mailed on Jul. 4, 2023.
The international search report received in the corresponding International Application PCT/CN2021/123647, mailed on Jul. 7, 2022.
The Non-Final Office Action received in the corresponding U.S. Appl. No. 17/935,934, mailed on Aug. 16, 2024.

* cited by examiner

ELECTRODE ASSEMBLY, SECONDARY BATTERY, BATTERY MODULE, BATTERY PACK AND ELECTRICAL DEVICE

CROSS-REFERENCES TO RELATED APPLICATIONS

This application is a continuation of International Application PCT/CN2021/123648, filed Oct. 13, 2021 and entitled "ELECTRODE ASSEMBLY, SECONDARY BATTERY, BATTERY MODULE, BATTERY PACK AND ELECTRICAL DEVICE", which is incorporated herein by reference in its entirety.

TECHNICAL FIELD

The present disclosure belongs to the technical field of battery, in particular to an electrode assembly, a secondary battery, a battery module, a battery pack, and an electrical device.

BACKGROUND

In recent years, with promotion of secondary batteries in industries such as various electronic products and new energy vehicles, their energy density has received more and more attention. During the charge and discharge process of secondary batteries, active ions (such as lithium ions) are intercalated and deintercalated between a positive electrode and negative electrodes. Due to structural changes of active materials, decomposition of electrolytes, formation and destruction of SEI films on the surface of active materials and the like, active ions are inevitably consumed, and thus the capacity of secondary batteries is constantly attenuated and it is difficult for secondary batteries to have a longer cycle life.

SUMMARY

An object in accordance with the present disclosure is to provide an electrode assembly, secondary battery, battery module, battery pack and electrical device, aiming to greatly extend cycle life of the secondary battery.

A first aspect of the present disclosure provides an electrode assembly, comprising a positive electrode plate, a negative electrode plate and a separator disposed between the positive electrode plate and the negative electrode plate, the positive electrode plate comprising a positive electrode current collector and a first positive electrode film layer and a second positive electrode film layer located on two opposite surfaces of the positive electrode current collector, the negative electrode plate comprising a negative electrode current collector and a first negative electrode film layer and a second negative electrode film layer located on two opposite surfaces of the negative electrode current collector; in which the first positive electrode film layer is located on a side of the positive electrode current collector close to the separator and the second negative electrode film layer is located on a side of the negative electrode current collector near the separator, alternatively, the first positive electrode film layer is located on a side of the positive electrode current collector away from the separator and the second negative electrode film layer is located on a side of the negative electrode collector away from the separator; wherein the positive electrode plate satisfies 0<CAP1/CAP2<1, in which CAP1 represents capacity of the first positive electrode film layer in Ah, CAP2 represents capacity of the second positive electrode film layer in Ah, and the electrode assembly satisfies $R_4/R_3-R_2/R_1 \geq 0$, in which $R_1$ represents resistance of the first positive electrode film layer in Ω, $R_2$ represents resistance of the second positive electrode film layer in Ω, $R_3$ represents resistance of the first negative electrode film layer in mΩ and $R_4$ represents resistance of the second negative film layer in mΩ.

In the electrode assembly of the present disclosure, the storage capacities on both sides of the positive electrode plate are different, and by rationally setting the relationship between resistances on both sides of the positive electrode plate and resistances on both sides of the negative electrode plate, the voltage response speed of the low-capacity positive electrode film layer in charge process can be improved and the potential difference between the low-capacity positive electrode film layer and the high-capacity positive electrode film layer is increased, thereby enabling the high-capacity positive electrode film layer to have a sufficient amount of pre-stored active ions. As the cycle process of secondary batteries proceeds, the pre-stored active ions can be gradually released to supplement consumption of active ions, thereby delaying capacity decay of the secondary battery and greatly prolonging cycle life of the secondary battery.

In any embodiment of the present disclosure, the electrode assembly satisfies $0 \geq R_4/R_3-R_2/R_1 \geq 20$. Optionally, the electrode assembly satisfies $0 < R_4/R_3-R_2/R_1 \leq 20$. Optionally, $0.1 \leq R_4/R_3-R_2/R_1 \leq 2$.

In any embodiment of the present disclosure, the positive electrode plate satisfies 0.33≤CAP1/CAP2<1. Optionally, the positive electrode plate satisfies 0.5≤CAP1/CAP2<1. Optionally, the positive electrode plate satisfies 0.5≤CAP1/CAP2≤0.9.

When the ratio of capacity CAP1 of the first positive electrode film layer to capacity CAP2 of the second positive electrode film layer is within an appropriate range, the secondary battery can have a longer cycle life and a high energy density.

In any embodiment of the present disclosure, 0Ω<$R_1$≤20Ω. Optionally, 0Ω<$R_1$≤5Ω.

In any embodiment of the present disclosure, 0Ω<$R_2$≤20Ω. Optionally, 0Ω<$R_2$≤5Ω.

In any embodiment of the present disclosure, 0 mΩ<$R_3$≤200 mΩ. Optionally, 0 mΩ<$R_3$≤50 mΩ.

In any embodiment of the present disclosure, 0 mΩ<$R_4$≤200 mΩ. Optionally, 0 mΩ<$R_4$≤50 mΩ.

When resistances of the first positive electrode film layer, the second positive electrode film layer, the first negative electrode film layer and the second negative electrode film layer are within a suitable scope respectively, consistency of the positive electrode plate and the negative electrode plate is better, so that it is beneficial for the secondary battery to obtain a longer cycle life.

In any embodiment of the present disclosure, the first positive electrode film layer comprises a first positive electrode active material, the second positive electrode film layer comprises a second positive electrode active material, and the positive electrode plate satisfies one or more of the following (1)-(3): (1) a coating weight of the first positive electrode film layer is less than a coating weight of the second positive electrode film layer, (2) a gram capacity of the first positive electrode active material is less than a gram capacity of the second positive electrode active material, (3) $w_1 < w_2$, in which $w_1$ represents a mass percentage of the first positive electrode active material based on the total mass of the first positive electrode film layer, and $w_2$ represents a mass percentage of the second positive electrode active material based on the total mass of the second positive electrode film layer content.

In any embodiment of the present disclosure, the negative electrode plate satisfies $R_4/R_3 \geq 1$, and the electrode assembly satisfies $0 \leq R_4/R_3 - R_2/R_1 \leq 20$. Optionally, $0 \leq R_4/R_3 - R_2/R_1 \leq 5$. Optionally, $0.1 \leq R_4/R_3 - R_2/R_1 \leq 2$.

In any embodiment of the present disclosure, the negative electrode plate satisfies $R_4/R_3 \geq 1$, the positive electrode plate satisfies $0 < R_2/R_1 \leq 20$, and the electrode assembly satisfies $0 \leq R_4/R_3 - R_2/R_1 \leq 20$. Optionally, $0 \leq R_4/R_3 - R_2/R_1 \leq 5$. Optionally, $0.1 \leq R_4/R_3 - R_2/R_1 \leq 2$.

In any embodiment of the present disclosure, the negative electrode plate satisfies $1 \leq R_4/R_3 \leq 30$, the positive electrode plate satisfies $0 \leq R_2/R_1 \leq 20$, and the electrode assembly satisfies $0 \leq R_4/R_3 - R_2/R_1 \leq 20$. Optionally, $0 \leq R_4/R_3 - R_2/R_1 \leq 5$. Optionally, $0.1 \leq R_4/R_3 - R_2/R_1 \leq 2$.

In any embodiment of the present disclosure, the negative electrode plate satisfies $0 < R_4/R_3 < 1$, the positive electrode plate satisfies $0 < R_2/R_1 < 1$, and the electrode assembly satisfies $0 \leq R_4/R_3 - R_2/R_1 < 1$. Optionally, $0 < R_4/R_3 - R_2/R_1 < 1$. Optionally, $0.1 \leq R_4/R_3 - R_2/R_1 \leq 0.9$.

In any embodiment of the present disclosure, the negative electrode plate satisfies $0 \leq R_4/R_3 < 1$, the positive electrode plate satisfies $0.05 \leq R_2/R_1 \leq 0.9$, and the electrode assembly satisfies $0 \leq R_4/R_3 - R_2/R_1 < 1$. Optionally, $0 < R_4/R_3 - R_2/R_1 < 1$. Optionally, $0.1 \leq R_4/R_3 - R_2/R_1 \leq 0.9$.

In any embodiment of the present disclosure, the negative electrode plate satisfies $0.05 \leq R_4/R_3 \leq 0.9$, the positive electrode plate satisfies $0.05 \leq R_2/R_1 \leq 0.9$, and the electrode assembly satisfies $0 \leq R_4/R_3 - R_2/R_1 < 1$. Optionally, $0 < R_4/R_3 - R_2/R_1 < 1$.

In any embodiment of the present disclosure, the positive electrode plate satisfies $R_2/R_1 = 1$, and the negative electrode plate satisfies $R_4/R_3 = 1$.

A second aspect of the present disclosure provides a secondary battery comprising an outer package, an electrolyte, and the electrode assembly according to the first aspect of the present disclosure.

In any embodiment of the present disclosure, the outer package includes a casing and a cover plate, the casing has an accommodating cavity and an opening, the electrode assembly is accommodated in the accommodating cavity, and the cover plate is used to close the opening of the casing.

A third aspect of the present disclosure provides a battery module comprising the secondary battery of the second aspect of the present disclosure.

A fourth aspect of the present disclosure provides a battery pack, comprising one of the secondary battery of the second aspect of the present disclosure and the battery module of the third aspect.

A fifth aspect of the present disclosure provides an electrical device comprising at least one of the secondary battery of the second aspect of the present disclosure, the battery module of the third aspect, and the battery pack of the fourth aspect.

The battery module, battery pack and electrical device in the present disclosure can have the same or similar effect due to the use of the secondary battery described in the present disclosure.

DESCRIPTION OF THE DRAWINGS

In order to explain the technical solutions of the embodiments of the present disclosure more clearly, the following will briefly introduce the drawings that need to be used in the embodiments of the present disclosure. Obviously, the drawings described below are only some embodiments of the present disclosure. A person of ordinary skill in the art can obtain other drawings based on the drawings without creative work.

DETAILED DESCRIPTION

Figure 1:
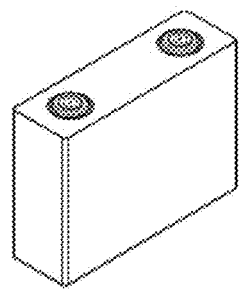
FIG. 1 is a schematic diagram of a secondary battery according to an embodiment of the present disclosure.

Hereinafter, embodiments of the electrode assembly, the secondary battery, the battery module, the battery pack, and the electrical device that specifically disclose the present disclosure will be described in detail with reference to the accompanying drawings as appropriate. However, unnecessary detailed descriptions may be omitted in some cases, for example the detailed description of a well-known item or the repetitive description of an actual identical structure so as to prevent the following description from becoming unnecessarily redundant and to facilitate understanding by those skilled in the art. In addition, the drawings and the following description are provided for those skilled in the art to fully understand the present disclosure, and are not intended to limit the subject matter described in the claims.

The "ranges" disclosed in this disclosure are defined in the form of lower and upper limits, and a given range is defined by selection of a lower limit and an upper limit that define boundary of the particular range. Ranges defined in this manner may or may not be inclusive of the endpoints, and may be arbitrarily combined. That is, any lower limit may be combined with any upper limit to form a range. For example, if the ranges of 60-120 and 80-110 are listed for a particular parameter, it is to be understood that the ranges of 60-110 and 80-120 are also contemplated. Additionally, if the minimum range values 1 and 2 are listed, and the maximum range values 3, 4, and 5 are listed, the following ranges are all expected: 1-3, 1-4, 1-5, 2-3, 2-4 and 2-5. In the present disclosure, unless stated otherwise, the numerical range "a-b" represents an abbreviated representation of any combination of real numbers between a and b, where both a and b are real numbers. For example, the numerical range "0-5" means that all real numbers between "0-5" have been listed herein, and the range "0-5" is just an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, and the like.

Unless stated otherwise, all the embodiments and the optional embodiments of the present disclosure can be combined with each other to form a new technical solution, and such a technical solution should be considered to be included in the disclosure of the present disclosure.

Unless stated otherwise, all technical features and optional technical features of the present disclosure can be combined with each other to form a new technical solution, and such a technical solutions should be considered to be included in the disclosure of the present disclosure.

Unless stated otherwise, all steps of the present disclosure can be carried out sequentially, and also can be carried out randomly, preferably they are carried out sequentially. For example, the method includes steps (a) and (b), indicating that the method may include steps (a) and (b) performed in sequence, or that the method may include steps (b) and (a) performed in sequence. For example, reference to the method further comprising step (c) indicates that step (c) may be added to the method in any order. As an example, the method may comprises steps (a), (b) and (c), steps (a), (c) and (b), or steps (c), (a) and (b), and the like.

Unless stated otherwise, the transition phases "comprising" and "comprising" mentioned in the present disclosure means that it is drafted in an open mode or in a close mode. For example, the transition phases "comprising" and "comprising" may mean that other components not listed may also be included or contained, or only the listed components may be included or contained.

In the present disclosure herein, unless otherwise stated, the term "or" is inclusive. For example, the phrase "A or B" means A, B, or both A and B". More specifically, either of the following conditions meets "A or B": A is true (or present) and B is false (or absent); A is false (or absent) and B is true (or present); or both A and B are true (or present).

Electrode Assembly and Secondary Battery

A secondary battery, called a rechargeable battery or an accumulator, refers to a battery that can continue to be used by activating its active material by means of charge after it is discharged. The shape of the secondary battery is not particularly limited in the present disclosure, and it may be cylindrical, square or any other shape. FIG. 1 is a schematic diagram of a secondary battery 5 of a square structure as an example.

Figure 2:
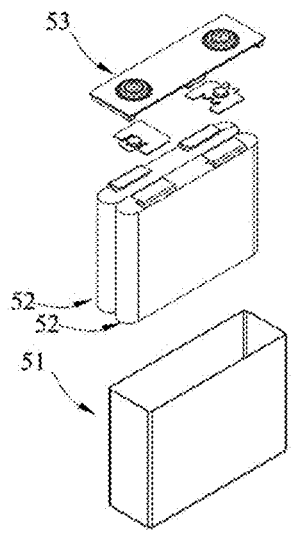
FIG. 2 is an exploded view of a secondary battery according to an embodiment of the present disclosure.

The secondary battery 5 includes an outer package, an electrode assembly, and an electrolyte, and the outer package is used to encapsulate the electrode assembly and the electrolyte. In some embodiments, the outer package of the secondary battery may be a hard case, such as a hard plastic case, an aluminum case, a steel case, and the like. The outer package of the secondary battery may also be a soft package, such as a pouch-type soft package. Material of the soft bag can be plastic, such as one or more of polypropylene (PP), polybutylene terephthalate (PBT), and polybutylene succinate (PBS). In some embodiments, as shown in FIG. 2, the outer package may include a casing 51 and a cover plate 53, wherein the casing 51 may include a bottom plate and side plates connected to the bottom plate, and the bottom plate and the side plates are enclosed to form an accommodating cavity. The casing 51 has an opening communicating with the accommodating cavity, and the cover plate 53 is used to cover the opening to close the accommodating cavity. The electrode assembly 52 is packaged in the accommodating cavity, and the electrolyte is infiltrated in the electrode assembly 52. The number of electrode assemblies 52 contained in the secondary battery 5 may be one or several, and may be adjusted according to requirements.

Figure 3:
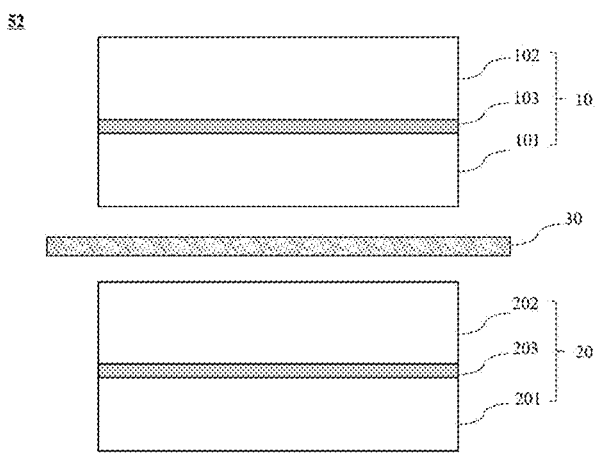
FIG. 3 is a schematic structural diagram of an electrode assembly according to an embodiment of the present disclosure.

Through extensive research, the inventors have proposed an electrode assembly with greatly extended cycle life. FIG. 3 is a schematic structural diagram of an embodiment of an electrode assembly according to the present disclosure. As shown in FIG. 3, the electrode assembly 52 comprises a positive electrode plate 10, a negative electrode plate 20 and a separator 30, wherein the separator 30 is disposed between the positive electrode plate 10 and the negative electrode plate 20, the positive electrode plate 10, the negative electrode plate 20 and the separator 30 may form the electrode assembly 52 through a winding process or a lamination process.

The positive electrode plate 10 comprises a first positive electrode film layer 101, a second positive electrode film layer 102 and a positive electrode current collector 103, and the first positive electrode film layer 101 and the second positive electrode film layer 102 are located on two opposite surfaces of the positive electrode current collector 103. The first positive electrode film layer 101 comprises a first positive electrode active material, a first positive electrode conductive agent and a first positive electrode binder, and the second positive electrode film layer 102 comprises a second positive electrode active material, a second positive electrode conductive agent and a second positive electrode binder.

The negative electrode plate 20 comprises a first negative electrode film layer 201, a second negative electrode film layer 202 and a negative electrode current collector 203, and the first negative electrode film layer 201 and the second negative electrode film layer 202 are located on two opposite surfaces of the negative electrode current collector 203. The first negative electrode film layer 201 comprises a first negative electrode active material, a first negative electrode conductive agent and a first negative electrode binder, and the second negative electrode film layer 202 comprises a second negative electrode active material, a second negative electrode conductive agent and a second negative electrode binder.

Figure 4:
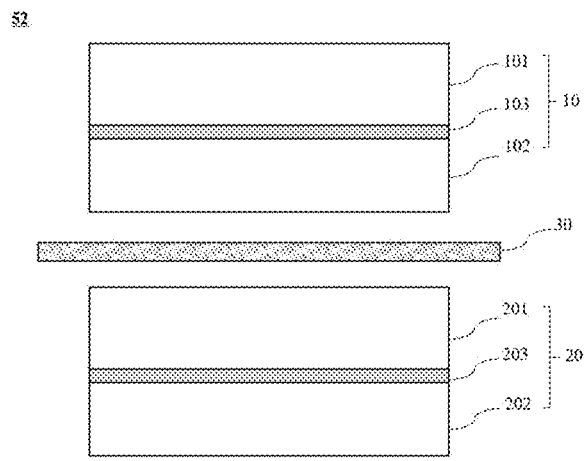
FIG. 4 is a schematic structural diagram of an electrode assembly according to another embodiment of the present disclosure.

The first positive electrode film layer 101 and the second negative electrode film layer 202 are disposed close to or away from the separator 30 at the same time. As shown in FIG. 3, in some embodiments, the first positive electrode film layer 101 is located on the side of the positive electrode current collector 103 close to the separator 30 and the second negative electrode film layer 202 is located on the side of the negative electrode current collector 203 close to the separator 30. As shown in FIG. 4, in some embodiments, the first positive electrode film layer 101 is located on the side of the positive electrode current collector 103 away from the separator 30 and the second negative electrode film layer 202 is located on the side of the negative electrode current collector 203 away from the separator 30.

In embodiments of the electrode assembly of the present disclosure, the positive electrode plate 10 satisfies 0<CAP1/CAP2<1, in which CAP1 represents capacity of the first positive electrode film layer 101 in Ah, and CAP2 represents capacity of the second positive electrode film layer 102 in Ah. The electrode assembly 52 satisfies $R_4/R_3 - R_2/R_1 \geq 0$, in which $R_1$ represents resistance of the first positive electrode film layer 101 in $\Omega$, $R_2$ represents resistance of the second positive electrode film layer 102 in $\Omega$, $R_3$ represents resistance of the first negative electrode film layer 201 in m$\Omega$, and $R_4$ represents resistance of the second negative electrode film layer 202 in m$\Omega$.

In the charge process of secondary batteries, active ions are de-intercalated from a positive electrode, and their de-intercalation rate and number are related to the charge current and period of secondary batteries. The larger the charge current and the longer the charge period, the more active ions are de-intercalated, the higher the de-intercalation capacity ratio (that is, the ratio of de-intercalation capacity to storage capacity) is, and the higher the positive electrode voltage is. During the charge process of the secondary battery of the present disclosure, current is evenly distributed in the positive electrode plate, and the low-capacity positive electrode film layer (the first positive electrode film layer in the present disclosure) and the high-capacity positive electrode film layer (the second positive electrode film layer in the present disclosure) are simultaneously de-intercalated with active ions and the active ions de-intercalated are the same in number. However, since storage capacities of the low-capacity positive electrode film layer and the high-capacity positive electrode film layer are different, the low-capacity positive electrode film layer and the high-capacity positive electrode film layer have different de-intercalation capacity ratios, and their corresponding voltage are also different. Meanwhile, the high-capacity positive electrode film layer has a de-intercalation capacity ratio lower than the low-capacity positive electrode film layer. Since the low-capacity positive electrode film layer and the high-capacity positive electrode film layer are in a parallel structure, charge cut-off voltage of the secondary battery will be triggered on the side that reaches the cut-off voltage first, i.e. on the side of the low-capacity positive electrode film layer, so that the high-capacity positive electrode film layer can have pre-stored active ions. In addition, there is a potential difference between the low-capacity positive electrode film layer and the high-capacity positive electrode film layer. Therefore, the pre-stored active ions in the high-capacity positive electrode film layer can be gradually de-intercalated and dissolved into the electrolyte and transferred into the low-capacity positive electrode film layer. As a result, the high-capacity positive electrode film layer can supplement active ion consumption of the low-capacity positive electrode film layer, thereby delaying the capacity decay of the secondary battery and greatly extending the cycle life of the secondary battery.

Conventional positive electrode plate with a double-sided coating design is often unable to realize active ion pre-storage, or does not have sufficient pre-stored active ions due to insufficient voltage response in practical disclosure process, which cannot promote the cycle life of secondary batteries obviously, nor does it enable secondary batteries to have a longer cycle life. In the electrode assembly of the present disclosure, the storage capacities on both sides of the positive electrode plate are different, and by rationally setting the relationship between the resistance on both sides of the positive electrode plate and the resistance on both sides of the negative electrode plate, the voltage response speed of the low-capacity positive electrode film layer in charge process can be improved and the potential difference between the low-capacity positive electrode film layer and the high-capacity positive electrode film layer is increased, thereby enabling the high-capacity positive electrode film layer to have a sufficient amount of pre-stored active ions. As the cycle process of secondary batteries proceeds, the pre-stored active ions can be gradually released to supplement consumption of active ions, thereby delaying capacity decay of the secondary battery and greatly prolonging cycle life of the secondary battery.

In the event that the electrode assembly 52 cannot reach $R_4/R_3 - R_2/R_1 \geq 0$, the difference between the de-intercalation capacity ratio of low-capacity positive electrode film layer and of the high-capacity positive electrode film layer is less, and the high-capacity positive electrode film layer does not have a sufficient amount of pre-stored active ions, thus the cycle life of the secondary battery is not significantly improved.

In the present disclosure, capacity of the positive electrode film layer has the meaning known in the art, and can be measured with instruments and methods known in the art. For example, a blue electric tester is used for testing. As an example, capacity of the positive electrode film layer can be tested by a method comprising the steps of wiping off a positive electrode film layer on one side of a cold-pressed positive electrode plate to obtain a single-sided coated positive electrode plate, upon punching and cutting it into small wafers with an area of S0, assembling them into a button battery in a glove box, and then subjecting to a charge-discharge process in which it is charged with a constant current of 0.1 mA to a charge cut-off voltage, and it is discharged with a constant current of 0.1 mA to a discharge cut-off voltage to obtain the discharge capacity CAP0, and then capacity of the positive electrode film layer is obtained by the formula $CAP0 \times S/S_0$, where $S_0$ is area of the small wafers, and S is area of the positive electrode film layer.

Specifically, the capacity CAP1 of the first positive electrode film layer can be tested by a method comprising the step of wiping off the second positive electrode film layer of the cold-pressed positive electrode plate and punching it into small wafers with an area of S0, and then assembling the small wafers into a button battery in a glove box, and then subjecting to a charge-discharge process with a blue electricity tester in which it is charged with a constant current of 0.1 mA to a charge cut-off voltage, and it is discharged with a constant current of 0.1 mA to a discharge cut-off voltage to obtain the discharge capacity CAP0, and then capacity CAP 1 of the first positive electrode film layer is obtained by the formula $CAP0 \times S_1/S_0$, where $S_0$ is area of the small wafers, and $S_1$ is area of the first positive electrode film layer. The capacity CAP2 of the second positive electrode film layer can be tested by a method comprising the step of wiping off the first positive electrode film layer of the cold-pressed positive electrode plate and punching it into small wafers with an area of S0, and then assembling the small wafers into a button battery in a glove box, and then subjecting to a charge-discharge process with a blue electricity tester in which it is charged with a constant current of 0.1 mA to a charge cut-off voltage, and it is discharged with a constant current of 0.1 mA to a discharge cut-off voltage to obtain the discharge capacity CAP0, and then capacity CAP2 of the second positive electrode film layer is obtained by the formula $CAP0 \times S_1/S_0$, where $S_0$ is area of the small wafers, and $S_2$ is area of the second positive electrode film layer.

The button battery can be assembled in the order of negative electrode shell, lithium plate, a drop of electrolyte, separator, a drop of electrolyte, a small wafer of area S0, a gasket, and a shrapnel. The button battery can be 14 mm in diameter. During the test, the film layer on one side of the electrode plate can be wiped off with water or other solvent. For the test, a tablet processor IEST from Yuanneng Technology Co., Ltd. can be used.

In this disclosure, resistance of film layer has the meaning known in the art, and can be measured with instruments and methods known in the art. For example, an electrode plate resistance meter (such as IEST BER1000 electrode plate resistance meter from Yuanneng Technology Co., Ltd) can be used. As an example, resistance of each film layer can be tested by a method comprising the steps of wiping off a film layer on one side of a cold-pressed electrode plate to obtain a single-coated electrode plate, and placing the single-coated electrode plate in parallel between two conductive terminals of the electrode plate resistance meter with a certain pressure for fixture, to obtain resistance of the film layer.

Specifically, the resistance $R_1$ of the first positive electrode film layer can be tested by a method comprising the steps of wiping off a second positive electrode film layer of a cold-pressed electrode plate to obtain a single-coated electrode plate, and placing the single-coated electrode plate in parallel between two conductive terminals of the electrode plate resistance meter with a certain pressure for fixture, to obtain the resistance $R_1$ of the first positive electrode film layer. The resistance $R_2$ of the second positive electrode film layer can be tested by a method comprising the steps of wiping off a first positive electrode film layer of a cold-pressed electrode plate to obtain a single-coated electrode plate, and placing the single-coated electrode plate in parallel between two conductive terminals of the electrode plate resistance meter with a certain pressure for fixture, to obtain the resistance $R_2$ of the second positive electrode film layer. The resistance $R_3$ of the first negative electrode film layer can be tested by a method comprising the steps of wiping off a second negative electrode film layer of a cold-pressed electrode plate to obtain a single-coated electrode plate, and placing the single-coated electrode plate in parallel between two conductive terminals of the electrode plate resistance meter with a certain pressure for fixture, to obtain the resistance $R_3$ of the first negative electrode film layer. The resistance $R_4$ of the second negative electrode film layer can be tested by a method comprising the steps of wiping off a first negative electrode film layer of a cold-pressed electrode plate to obtain a single-coated electrode plate, and placing the single-coated electrode plate in parallel between two conductive terminals of the electrode plate resistance meter with a certain pressure for fixture, to obtain the resistance $R_4$ of the second negative electrode film layer.

Optionally, the conductive terminal can have a diameter of 14 mm, the applied pressure can be from 15 Mpa to 27 Mpa, and the time range of sampling can be from 10 s to 20 s. When testing, the electrode plate can be cut with a certain area (for example, 10 cm×10 cm) and then carrying out testing. During the test, the film layer on one side of the electrode plate can be wiped off with water or other solvent.

It should be noted that the electrode plate (for example, the positive electrode plate or negative electrode plate) can directly obtained the freshly cold-pressed electrode plate for testing, or can be obtain from a secondary battery. As an example, a method of obtaining an electrode plate from a secondary battery comprises the steps of disassembling a fully-discharged secondary battery to obtain its electrode plate, and soaking the electrode plate in an organic solvent (e.g., dimethyl carbonate) for a period of time (e.g., 30 min), then taking the electrode plate out and drying it at a certain temperature for a period, for example, at 80° C. for 6 h.

In some embodiments, the electrode assembly 52 satisfies $0 \leq R_4/R_3 - R_2/R_1 \leq 20$. When $R_4/R_3 - R_2/R_1 > 20$, the secondary battery will quickly reach the charge cut-off voltage during charge, so that there are a large amount of active ions in the low-capacity positive electrode film layer and the high-capacity positive film layer that are not released, thereby reducing energy density of the secondary battery.

For example, $R_4/R_3 - R_2/R_1$ is 0, 0.05, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20 or the ranges formed by the any values. Optionally, the electrode assembly 52 satisfies $0 \leq R_4/R_3 - R_2/R_1 \leq 20$, $0 \leq R_4/R_3 - R_2/R_1 \leq 15$, $0 \leq R_4/R_3 - R_2/R_1 \leq 10$, $0 \leq R_4/R_3 - R_2/R_1 \leq 8$, $0 \leq R_4/R_3 - R_2/R_1 \leq 5$, $0 \leq R_4/R_3 - R_2/R_1 \leq 2$, $0 < R_4/R_3 - R_2/R_1 \leq 20$, $0 < R_4/R_3 - R_2/R_1 \leq 15$, $0 < R_4/R_3 - R_2/R_1 \leq 10$, $0 < R_4/R_3 - R_2/R_1 \leq 8$, $0 < R_4/R_3 - R_2/R_1 \leq 5$, $0 < R_4/R_3 - R_2/R_1 \leq 2$, $0.1 \leq R_4/R_3 - R_2/R_1 \leq 20$, $0.1 \leq R_4/R_3 - R_2/R_1 \leq 15$, $0.1 \leq R_4/R_3 - R_2/R_1 \leq 10$, $0.1 \leq R_4/R_3 - R_2/R_1 \leq 8$, $0.1 \leq R_4/R_3 - R_2/R_1 \leq 5$, or $0.1 \leq R_4/R_3 - R_2/R_1 \leq 2$.

In the positive electrode plate 10, capacity CAP1 of the first positive electrode film layer 101 is smaller than capacity CAP2 of the second positive electrode film layer 102. For example, CAP1/CAP2 is 0.1, 0.2, 0.33, 0.4, 0.5, 0.6, 0.7, 0.8, 0.9 or the ranges formed by the any values. Optionally, $0 < CAP1/CAP2 < 1$, $0.1 \leq CAP1/CAP2 < 1$, $0.2 \leq CAP1/CAP2 < 1$, $0.33 \leq CAP1/CAP2 < 1$, $0.4 \leq CAP1/CAP2 < 1$, $0.5 \leq CAP1/CAP2 < 1$, $0 < CAP1/CAP2 \leq 0.9$, $0.1 \leq CAP1/CAP2 \leq 0.9$, $0.2 \leq CAP1/CAP2 \leq 0.9$, $0.33 \leq CAP1/CAP2 \leq 0.9$, $0.4 \leq CAP1/CAP2 \leq 0.9$, $0.5 \leq CAP1/CAP2 \leq 0.9$, $0 < CAP1/CAP2 \leq 0.8$, $0.1 \leq CAP1/CAP2 \leq 0.8$, $0.2 \leq CAP1/CAP2 \leq 0.8$, $0.33 \leq CAP1/CAP2 \leq 0.8$, $0.4 \leq CAP1/CAP2 \leq 0.8$, or $0.5 \leq CAP1/CAP2 \leq 0.8$.

When the ratio of capacity CAP1 of the first positive electrode film layer to capacity CAP2 of the second positive electrode film layer is within an appropriate range, the secondary battery can have a longer cycle life and a high energy density at the same time.

In some embodiments, resistance $R_1$ of the first positive electrode film layer 101 satisfies $0\Omega < R_1 \leq 20\Omega$. Optionally, $0\Omega < R_1 \leq 5\Omega$.

In some embodiments, resistance $R_2$ of the second positive electrode film layer 102 satisfies $0\Omega < R_2 \leq 20\Omega$. Optionally, $0\Omega < R_2 \leq 5\Omega$.

In some embodiments, resistance $R_3$ of the first negative electrode film layer 201 satisfies 0 mΩ<$R_3$≤200 mΩ. Optionally, 0 mΩ<$R_3$≤50 mΩ.

In some embodiments, resistance $R_4$ of the second negative electrode film layer 202 satisfies 0 mΩ<$R_4$≤200 mΩ. Optionally, 0 mΩ<$R_4$≤50 mΩ.

When resistances of the first positive electrode film layer, the second positive electrode film layer, the first negative electrode film layer and the second negative electrode film layer are within suitable ranges respectively, consistency of the positive electrode plate and the negative electrode plate is better, and thus it is beneficial for the secondary battery to obtain longer cycle life.

In some embodiments, the negative electrode plate 20 satisfies $R_4/R_3$≥1, and the electrode assembly 52 satisfies 0≤$R_4/R_3-R_2/R_1$≤20, so that the secondary battery has a longer cycle life and a high energy density.

For example, $R_4/R_3$ is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or the ranges formed by any above values. Optionally, the negative electrode plate 20 satisfies 1≤$R_4/R_3$≤30, 1≤$R_4/R_3$≤25, 1≤$R_4/R_3$≤20, 1≤$R_4/R_3$≤15, 1≤$R_4/R_3$≤10, 1≤$R_4/R_3$≤8, 1≤$R_4/R_3$≤5, 1≤$R_4/R_3$≤4, 1≤$R_4/R_3$≤3, 1≤$R_4/R_3$≤2, 1<$R_4/R_3$≤30, 1<$R_4/R_3$≤25, 1<$R_4/R_3$≤20, 1<$R_4/R_3$≤15, 1<$R_4/R_3$≤10, 1<$R_4/R_3$≤8, 1<$R_4/R_3$≤5, 1<$R_4/R_3$≤4, 1<$R_4/R_3$≤3, or 1<$R_4/R_3$≤2.

For example, $R_4/R_3-R_2/R_1$ is 0, 0.05, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20 or the ranges formed by any above values. Optionally, the electrode assembly 52 satisfies 0≤$R_4/R_3-R_2/R_1$≤20, 0≤$R_4/R_3-R_2/R_1$≤15, 0≤$R_4/R_3-R_2/R_1$≤10, 0≤$R_4/R_3-R_2/R_1$≤8, 0≤$R_4/R_3-R_2/R_1$≤5, 0≤$R_4/R_3-R_2/R_1$≤2, 0<$R_4/R_3-R_2/R_1$≤20, 0<$R_4/R_3-R_2/R_1$≤15, 0<$R_4/R_3-R_2/R_1$≤10, 0<$R_4/R_3-R_2/R_1$≤8, 0<$R_4/R_3-R_2/R_1$≤5, 0<$R_4/R_3-R_2/R_1$≤2, 0.1≤$R_4/R_3-R_2/R_1$≤20, 0.1≤$R_4/R_3-R_2/R_1$≤15, 0.1≤$R_4/R_3-R_2/R_1$≤10, 0.1≤$R_4/R_3-R_2/R_1$≤8, 0.1≤$R_4/R_3-R_2/R_1$≤5, or 0.1≤$R_4/R_3-R_2/R_1$≤2.

As used herein, the resistance ratio $R_2/R_1$ of the first positive electrode film layer 101 and the second positive electrode film layer 102 is not particularly limited, and $R_2/R_1$ may be greater than 1, equal to 1, or less than 1. For example, $R_2/R_1$ is 0.05, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20 or the ranges formed by any above values. Optionally, the positive electrode plate 10 satisfies 0<$R_2/R_1$≤20, 0<$R_2/R_1$≤15, 0<$R_2/R_1$≤10, 0<$R_2/R_1$≤8, 0<$R_2/R_1$≤5, 0<$R_2/R_1$≤4, 0<$R_2/R_1$≤3, 0<$R_2/R_1$≤2, or 0<$R_2/R_1$≤1.

For example, the negative electrode plate 20 satisfies $R_4/R_3$≥1, the positive electrode plate 10 satisfies 0<$R_2/R_1$≤20, and the electrode assembly 52 satisfies 0≤$R_4/R_3-R_2/R_1$≤20. Optionally, the electrode assembly 52 satisfies 0<$R_4/R_3-R_2/R_1$≤20. Optionally, the electrode assembly 52 satisfies 0≤$R_4/R_3-R_2/R_1$≤5. Optionally, the electrode assembly 52 satisfies 0<$R_4/R_3-R_2/R_1$≤5. Optionally, the electrode assembly 52 satisfies 0.1≤$R_4/R_3-R_2/R_1$≤2.

For example, the negative electrode plate 20 satisfies 1≤$R_4/R_3$≤30, the positive electrode plate 10 satisfies 0<$R_2/R_1$≤20, and the electrode assembly 52 satisfies 0≤$R_4/R_3-R_2/R_1$≤20. Optionally, the electrode assembly 52 satisfies 0<$R_4/R_3-R_2/R_1$≤20. Optionally, the electrode assembly 52 satisfies 0≤$R_4/R_3-R_2/R_1$≤5. Optionally, the electrode assembly 52 satisfies 0<$R_4/R_3-R_2/R_1$≤5. Optionally, the electrode assembly 52 satisfies 0.1≤$R_4/R_3-R_2/R_1$≤2.

In some embodiments, the negative electrode plate 20 satisfies 0<$R_4/R_3$<1, the positive electrode plate 10 satisfies 0<$R_2/R_1$<1, and the electrode assembly 52 satisfies 0≤$R_4/R_3-R_2/R_1$<1. As a result, the secondary battery has a longer cycle life and a high energy density.

For example, $R_4/R_3$ is 0.05, 0.1, 0.2, 0.3, 0.4, 0.5, 0.6, 0.7, 0.8, 0.9 or the ranges formed by any above values. Optionally, the negative electrode plate 20 satisfies 0<$R_4/R_3$≤0.9, 0<$R_4/R_3$≤0.8, 0<$R_4/R_3$≤0.7, 0<$R_4/R_3$≤0.6, 0.05≤$R_4/R_3$<1, 0.05≤$R_4/R_3$≤0.9, 0.05≤$R_4/R_3$≤0.8, 0.05≤$R_4/R_3$≤0.7, 0.05≤$R_4/R_3$≤0.6, 0.1≤$R_4/R_3$≤1, 0.1≤$R_4/R_3$≤0.9, 0.1≤$R_4/R_3$≤0.8, 0.1≤$R_4/R_3$≤0.7, 0.1≤$R_4/R_3$≤0.6, 0.2≤$R_4/R_3$<1, 0.2≤$R_4/R_3$≤0.9, 0.2≤$R_4/R_3$≤0.8, 0.2≤$R_4/R_3$≤0.7, or 0.2≤$R_4/R_3$≤0.6.

For example, $R_2/R_1$ is 0.05, 0.1, 0.2, 0.3, 0.4, 0.5, 0.6, 0.7, 0.8, 0.9 or the ranges formed by any above values. Optionally, the positive electrode plate 10 satisfies 0<$R_2/R_1$≤0.9, 0<$R_2/R_1$≤0.8, 0<$R_2/R_1$≤0.7, 0<$R_2/R_1$≤0.6, 0.05≤$R_2/R_1$≤1, 0.05≤$R_2/R_1$≤0.9, 0.05≤$R_2/R_1$≤0.8, 0.05≤$R_2/R_1$≤0.7, 0.05≤$R_2/R_1$≤0.6, 0.1≤$R_2/R_1$≤1, 0.1≤$R_2/R_1$≤0.9, 0.1≤$R_2/R_1$≤0.8, 0.1≤$R_2/R_1$≤0.7, 0.1≤$R_2/R_1$≤0.6, 0.2≤$R_2/R_1$<1, 0.2≤$R_2/R_1$≤0.9, 0.2≤$R_2/R_1$≤0.8, 0.2≤$R_2/R_1$≤0.7, or 0.2≤$R_2/R_1$≤0.6.

For example, $R_4/R_3-R_2/R_1$ is 0, 0.05, 0.1, 0.2, 0.3, 0.4, 0.5, 0.6, 0.7, 0.8, 0.9 or the ranges formed by any above values. Optionally, the electrode assembly 52 satisfies 0≤$R_4/R_3-R_2/R_1$<1, 0≤$R_4/R_3-R_2/R_1$≤0.9, 0≤$R_4/R_3-R_2/R_1$≤0.8, 0≤$R_4/R_3-R_2/R_1$≤0.7, 0<$R_4/R_3-R_2/R_1$≤0.6, 0<$R_4/R_3-R_2/R_1$<1, 0<$R_4/R_3-R_2/R_1$≤0.9, 0<$R_4/R_3-R_2/R_1$≤0.8, 0<$R_4/R_3-R_2/R_1$≤0.7, 0<$R_4/R_3-R_2/R_1$≤0.6, 0.05≤$R_4/R_3-R_2/R_1$<1, 0.05≤$R_4/R_3-R_2/R_1$≤0.9, 0.05≤$R_4/R_3-R_2/R_1$≤0.8, 0.05≤$R_4/R_3-R_2/R_1$≤0.7, 0.05≤$R_4/R_3-R_2/R_1$≤0.6, 0.1≤$R_4/R_3-R_2/R_1$<1, 0.1≤$R_4/R_3-R_2/R_1$≤0.9, 0.1≤$R_4/R_3-R_2/R_1$≤0.8, 0.1≤$R_4/R_3-R_2/R_1$≤0.7, 0.1≤$R_4/R_3-R_2/R_1$≤0.6, 0.2≤$R_4/R_3-R_2/R_1$<1, 0.2≤$R_4/R_3-R_2/R_1$≤0.9, 0.2≤$R_4/R_3-R_2/R_1$≤0.8, 0.2≤$R_4/R_3-R_2/R_1$≤0.7, or 0.2≤$R_4/R_3-R_2/R_1$≤0.6.

For example, the negative electrode plate 20 satisfies 0<$R_4/R_3$<1, the positive electrode plate 10 satisfies 0<$R_2/R_1$<1, and the electrode assembly 52 satisfies 0<$R_4/R_3-R_2/R_1$<1.

For example, the negative electrode plate 20 satisfies 0<$R_4/R_3$≤1, the positive electrode plate 10 satisfies 0<$R_2/R_1$<1, and the electrode assembly 52 satisfies 0.1≤$R_4/R_3-R_2/R_1$≤0.9.

For example, the negative electrode plate 20 satisfies 0<$R_4/R_3$<1, the positive electrode plate 10 satisfies 0.05≤$R_4/R_3$≤0.9, and the electrode assembly 52 satisfies 0≤$R_4/R_3-R_2/R_1$<1.

For example, the negative electrode plate 20 satisfies 0<$R_4/R_3$<1, the positive electrode plate 10 satisfies 0.05≤$R_4/R_3$≤0.9, and the electrode assembly 52 satisfies 0≤$R_4/R_3-R_2/R_1$<1.

For example, the negative electrode plate 20 satisfies 0<$R_4/R_3$<1, the positive electrode plate 10 satisfies 0.05≤$R_4/R_3$≤0.9, and the electrode assembly 52 satisfies 0.1≤$R_4/R_3-R_2/R_1$≤0.9.

For example, the negative electrode plate 20 satisfies 0.05≤$R_4/R_3$≤0.9, the positive electrode plate 10 satisfies 0.05≤$R_4/R_3$≤0.9, and the electrode assembly 52 satisfies 0≤$R_4/R_3-R_2/R_1$≤1.

For example, the negative electrode plate 20 satisfies 0.05≤$R_4/R_3$≤0.9, the positive electrode plate 10 satisfies 0.05≤$R_4/R_3$≤0.9, and the electrode assembly 52 satisfies 0≤$R_4/R_3-R_2/R_1$<1.

For example, the negative electrode plate 20 satisfies 0.05≤$R_4/R_3$≤0.9, the positive electrode plate 10 satisfies 0.05≤$R_4/R_3$≤0.9, and the electrode assembly 52 satisfies 0.1≤$R_4/R_3-R_2/R_1$≤0.8.

In some embodiments, the positive electrode plate 10 satisfies $R_2/R_1=1$, the negative electrode plate 20 satisfies $R_4/R_3=1$, and the electrode assembly 52 satisfies $R_4/R_3-R_2/R_1=0$.

It should be noted that there are various theoretically feasible ways to adjust capacity CAP1 of the first positive electrode film layer 101 and capacity CAP2 of the second positive electrode film layer 102. In the present disclosure, some of the adjustment ways are listed. It should be understood that the ways listed in the specification are only for explaining the present disclosure, not for limiting the present disclosure.

As an example, when the positive electrode plate 10 satisfies one or more of the following (1) to (3), capacity CAP1 of the first positive electrode film layer 101 is smaller than capacity CAP2 of the second positive electrode film layer 102.

(1) A coating weight of the first positive electrode film layer 101 is less than a coating weight of the second positive electrode film layer 102.

(2) A gram capacity of the first positive electrode active material is less than a gram capacity of the second positive electrode active material.

(3) $w_1 < w_2$, in which $w_1$ represents a mass percentage of the first positive electrode active material based on the total mass of the first positive electrode film layer 101, and $w_2$ represents a mass percentage of the second positive electrode active material based on the total mass of the second positive electrode film layer 102.

It should be noted that there are various theoretically feasible ways to adjust resistance $R_1$ of the first positive electrode film layer 101, resistance $R_2$ of the second positive electrode film layer 102, resistance $R_3$ of the first negative electrode film layer 201, and resistance $R_4$ of the second negative electrode film layer 202. In the present disclosure, some of the adjustment ways are listed. It should be understood that the ways listed in the specification are only for explaining the present disclosure, not for limiting the present disclosure.

As an example, when the positive electrode plate 10 satisfies one or more of the following (4) to (10), resistance $R_2$ of the second positive electrode film layer 102 is smaller than resistance $R_1$ of the first positive electrode film layer 101.

(4) The second positive electrode active material has a conductive carbon layer on the surface thereof. When the second positive electrode active material has a conductive carbon layer on the surface thereof, and the first positive electrode active material does not have a conductive carbon layer on the surface thereof, resistance $R_2$ of the second positive electrode film layer 102 can be smaller than resistance $R_1$ of the first positive electrode film layer 101.

(5) A conductivity of the second positive electrode conductive agent is greater than a conductivity of the first positive electrode conductive agent. By making the second positive electrode film layer 102 comprise a second positive electrode conductive agent with a higher conductivity, resistance $R_2$ of the second positive electrode film layer 102 can be smaller than resistance $R_1$ of the first positive electrode film layer 101.

(6) $w_3 < w_4$, in which $w_3$ represents a mass percentage of the first positive electrode conductive agent based on the total mass of the first positive electrode film layer 101, and $w_4$ represents a mass percentage of the second positive electrode conductive agent based on the total mass of the second positive electrode film layer 102.

(7) $w_5 > w_6$, in which $w_5$ represents a mass percentage of the first positive electrode binder based on the total mass of the first positive electrode film layer 101, and $w_6$ represents a mass percentage of the second positive electrode binder based on the total mass of the second positive electrode film layer 102.

(8) A compaction density of the second positive electrode film layer 102 is smaller than a compaction density of the first positive electrode film layer 101.

Figure 5:
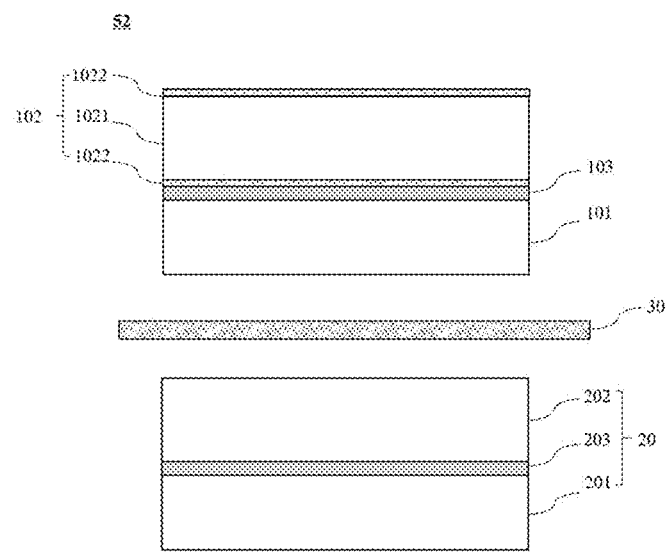
FIG. 5 is a schematic structural diagram of an electrode assembly according to another embodiment of the present disclosure.

(9) As shown in FIG. 5, the second positive electrode film layer 102 comprises a second positive electrode base layer 1021 and a second positive electrode conductive carbon layer 1022, and the second positive electrode conductive carbon layer 1022 is disposed on at least one of two opposite surfaces of the second positive electrode base layer 1021.

Figure 6:
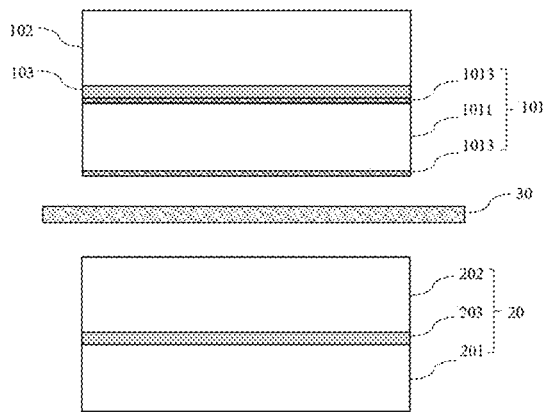
FIG. 6 is a schematic structural diagram of an electrode assembly according to another embodiment of the present disclosure.

(10) As shown in FIG. 6, the first positive electrode film layer 101 comprises a first positive electrode base layer 1011 and a first positive electrode ceramic layer 1013, and the first positive electrode ceramic layer 1013 is disposed on at least one of two opposite surfaces of the first positive electrode base layer 1011. Optionally, the first positive electrode ceramic layer 1013 comprises one or more of alumina ceramics, silicon nitride ceramics, silicon carbide ceramics, and boron nitride ceramics.

Figure 7:
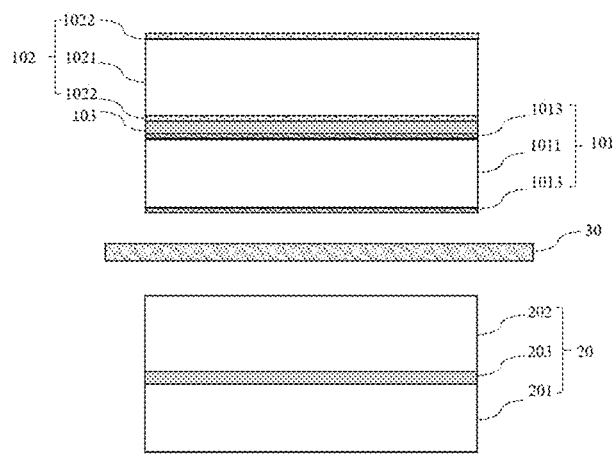
FIG. 7 is a schematic structural diagram of an electrode assembly according to another embodiment of the present disclosure.

It can be understood that although the second positive electrode conductive carbon layer 1022 is disposed on two opposite surfaces of the second positive electrode base layer 1021 as shown in FIG. 5, in other embodiments, the second positive electrode conductive carbon layer 1022 may also be disposed on one of two opposite surfaces of the second positive electrode base layer 1021. Although the first positive electrode ceramic layer 1013 is disposed on two opposite surfaces of the first positive electrode base layer 1011 as shown in FIG. 6, in other embodiments, the first positive electrode ceramic layer 1013 may also be disposed on one of two opposite surfaces of the first positive electrode base layer 1011. As shown in FIG. 7, the positive electrode plate 10 may satisfy the above (9) and (10) both, so that resistance $R_2$ of the second positive electrode film layer 102 is smaller than resistance $R_1$ of the first positive electrode film layer 101.

As an example, when the positive electrode plate 10 satisfies one or more of the following (11) to (17), resistance $R_2$ of the second positive electrode film layer 102 is greater than resistance $R_1$ of the first positive electrode film layer 101.

(11) The first positive electrode active material has a conductive carbon layer on the surface thereof. When the first positive electrode active material has a conductive carbon layer on the surface thereof, and the second positive electrode active material does not have a conductive carbon layer on the surface thereof, resistance $R_2$ of the second positive electrode film layer 102 can be greater than resistance $R_1$ of the first positive electrode film layer 101.

(12) A conductivity of the second positive electrode conductive agent is smaller than a conductivity of the first positive electrode conductive agent. By making the first positive electrode film layer 101 comprise a first positive electrode conductive agent with a higher conductivity, resistance $R_2$ of the second positive electrode film layer 102 can be greater than resistance $R_1$ of the first positive electrode film layer 101.

(13) $w_3 > w_4$, in which $w_3$ represents a mass percentage of the first positive electrode conductive agent based on the total mass of the first positive electrode film layer 101, and $w_4$ represents a mass percentage of the second positive electrode conductive agent based on the total mass of the second positive electrode film layer 102.

(14) $w_5<w_6$, in which $w_5$ represents a mass percentage of the first positive electrode binder based on the total mass of the first positive electrode film layer 101, and $w_6$ represents a mass percentage of the second positive electrode binder based on the total mass of the second positive electrode film layer 102.

(15) A compaction density of the second positive electrode film layer 102 is greater than a compaction density of the first positive electrode film layer 101.

Figure 8:
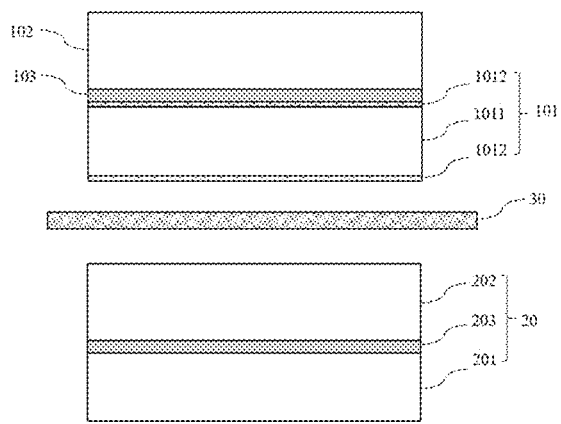
FIG. 8 is a schematic structural diagram of an electrode assembly according to another embodiment of the present disclosure.

(16) As shown in FIG. 8, the first positive electrode film layer 101 comprises a first positive electrode base layer 1011 and a first positive electrode conductive carbon layer 1012, and the first positive electrode conductive carbon layer 1012 is disposed on at least one of two opposite surfaces of the first positive electrode base layer 1011.

Figure 9:
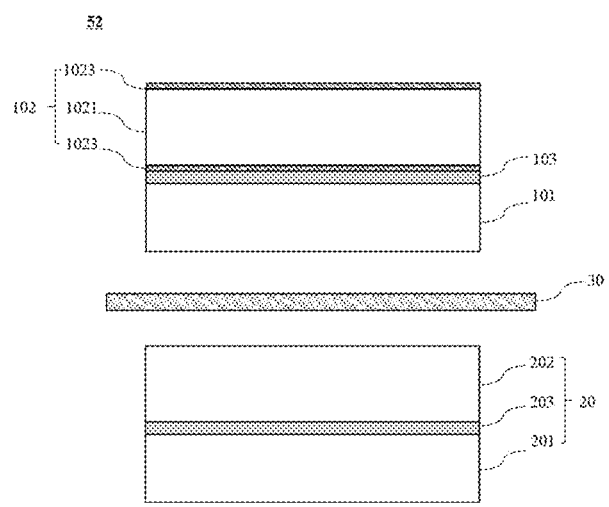
FIG. 9 is a schematic structural diagram of an electrode assembly according to another embodiment of the present disclosure.

(17) As shown in FIG. 9, the second positive electrode film layer 102 comprises a second positive electrode base layer 1021 and a second positive electrode ceramic layer 1023, and the second positive electrode ceramic layer 1023 is disposed on at least one of two opposite surfaces of the second positive electrode base layer 1021. Optionally, the second positive electrode ceramic layer 1023 comprises one or more of alumina ceramics, silicon nitride ceramics, and silicon carbide ceramics, and boron nitride ceramics.

Figure 10:
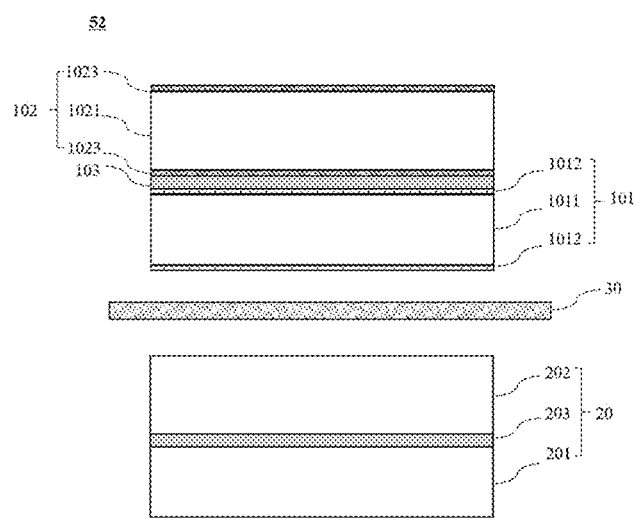
FIG. 10 is a schematic structural diagram of an electrode assembly according to another embodiment of the present disclosure.

It can be understood that although the first positive electrode conductive carbon layer 1012 is disposed on two opposite surfaces of the first positive electrode base layer 1011 as shown in FIG. 8, in other embodiments, the first positive electrode conductive carbon layer 1012 may also be disposed on one of two opposite surfaces of the first positive electrode base layer 1011. Although the second positive electrode ceramic layer 1023 is disposed on two opposite surfaces of the second positive electrode base layer 1021 as shown in FIG. 9, in other embodiments, the second positive electrode ceramic layer 1023 may also be disposed on one of two opposite surfaces of the second positive electrode base layer 1021. As shown in FIG. 10, the positive electrode plate 10 may satisfy the above (16) and (17) both, so that resistance $R_2$ of the second positive electrode film layer 102 is greater than resistance $R_1$ of the first positive electrode film layer 101.

As an example, when the negative electrode plate 20 satisfies one or more of the following (a) to (g), resistance $R_4$ of the second negative electrode film layer 202 is greater than resistance $R_3$ of the first positive electrode film layer 101.

(a) The first negative electrode active material has a conductive carbon layer on the surface thereof. When the first negative electrode active material has a conductive carbon layer on the surface thereof, and the second negative electrode active material does not have a conductive carbon layer on the surface thereof, resistance $R_4$ of the second negative electrode film layer 202 can be greater than resistance $R_3$ of the first negative electrode film layer 201.

(b) A conductivity of the first negative electrode conductive agent is greater than a conductivity of the second negative electrode conductive agent. By making the first negative electrode film layer 201 comprise a first negative electrode conductive agent with a higher conductivity, resistance $R_4$ of the second negative electrode film layer 202 can be greater than resistance $R_3$ of the first negative electrode film layer 201.

(c) $w_7>w_8$, in which $w_7$ represents a mass percentage of the first negative electrode conductive agent based on the total mass of the first negative electrode film layer 201, and $w_8$ represents a mass percentage of the second negative electrode conductive agent based on the total mass of the second negative electrode film layer 202.

(d) $w_9<w_{10}$, in which $w_9$ represents a mass percentage of the first negative electrode binder based on the total mass of the first negative electrode film layer 201, and $w_{10}$ represents a mass percentage of the second negative electrode binder based on the total mass of the second negative electrode film layer 202.

(e) A compaction density of the first negative electrode film layer 201 is smaller than a compaction density of the second negative electrode film layer 202.

Figure 11:
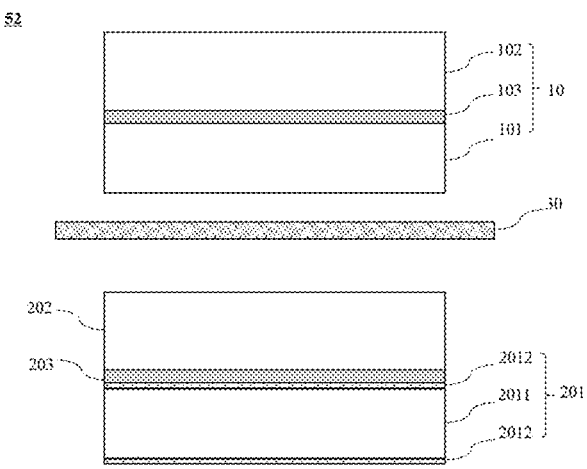
FIG. 11 is a schematic structural diagram of an electrode assembly according to another embodiment of the present disclosure.

(f) As shown in FIG. 11, the first negative electrode film layer 201 comprises a first negative electrode base layer 2011 and a first negative electrode conductive carbon layer 2012, and the first negative electrode conductive carbon layer 2012 is disposed on at least one of two opposite surfaces of the first negative electrode base layer 2011.

Figure 12:
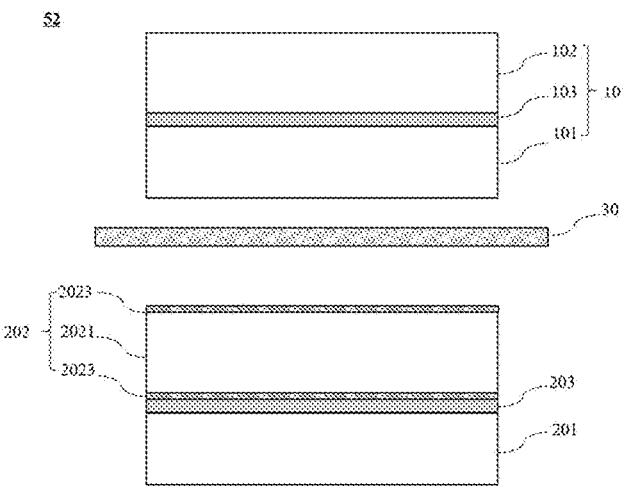
FIG. 12 is a schematic structural diagram of an electrode assembly according to another embodiment of the present disclosure.

(g) As shown in FIG. 12, the second negative electrode film layer 202 comprises a second negative electrode base layer 2021 and a second negative electrode ceramic layer 2023, and the second negative electrode ceramic layer 2023 is disposed on at least one of two opposite surfaces of the second negative electrode base layer 2021. Optionally, the second negative electrode ceramic layer 2023 comprises one or more of alumina ceramics, silicon nitride ceramics, silicon carbide ceramics, and boron nitride ceramics.

Figure 13:
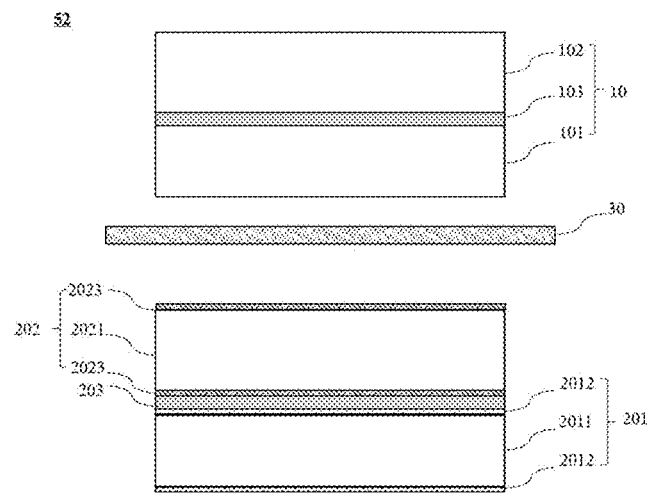
FIG. 13 is a schematic structural diagram of an electrode assembly according to another embodiment of the present disclosure.

It can be understood that although the first negative electrode conductive carbon layer 2012 is disposed on two opposite surfaces of the first negative electrode base layer 2011 as shown in FIG. 11, in other embodiments, the first negative electrode conductive carbon layer 2012 may also be disposed on one of two opposite surfaces of the first negative electrode base layer 2011. Although the second negative electrode ceramic layer 2023 is disposed on two opposite surfaces of the second negative electrode base layer 2021 as shown in FIG. 12, in other embodiments, the second negative electrode ceramic layer 2023 may also be disposed on one of two opposite surfaces of the second negative electrode base layer 2021. As shown in FIG. 13, the negative electrode plate 20 may satisfy the above (f) and (g) both, so that resistance $R_4$ of the second negative electrode film layer 202 is greater than resistance $R_3$ of the first negative electrode film layer 201.

As an example, when the negative electrode plate 20 satisfies one or more of the following (h) to (n), resistance $R_4$ of the second negative electrode film layer 202 is smaller than resistance $R_3$ of the first positive electrode film layer 101.

(h) The second negative electrode active material has a conductive carbon layer on the surface thereof. When the second negative electrode active material has a conductive carbon layer on the surface thereof, and the first negative electrode active material does not have a conductive carbon layer on the surface thereof, resistance $R_4$ of the second negative electrode film layer 202 can be smaller than resistance $R_3$ of the first negative electrode film layer 201.

(i) A conductivity of the first negative electrode conductive agent is smaller than a conductivity of the second negative electrode conductive agent. By making the second negative electrode film layer 202 comprise a second negative electrode conductive agent with a higher conductivity, resistance $R_4$ of the second negative electrode film layer 202 can be smaller than resistance $R_3$ of the first negative electrode film layer 201.

(j) $w_7<w_8$, in which $w_7$ represents a mass percentage of the first negative electrode conductive agent based on the total mass of the first negative electrode film layer 201, and $w_8$ represents a mass percentage of the second negative electrode conductive agent based on the total mass of the second negative electrode film layer 202.

(k) $w_9 > w_{10}$, in which $w_9$ represents a mass percentage of the first negative electrode binder based on the total mass of the first negative electrode film layer 201, and $w_{10}$ represents a mass percentage of the second negative electrode binder based on the total mass of the second negative electrode film layer 202.

(l) A compaction density of the first negative electrode film layer 201 is greater than a compaction density of the second negative electrode film layer 202.

Figure 14:
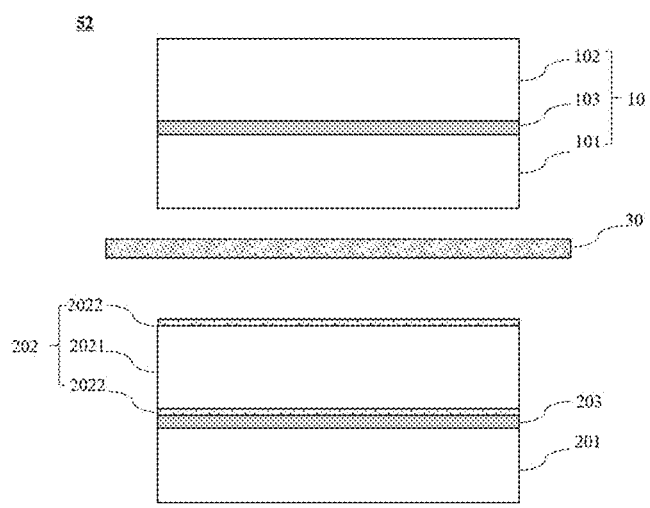
FIG. 14 is a schematic structural diagram of an electrode assembly according to another embodiment of the present disclosure.

(m) As shown in FIG. 14, the second negative electrode film layer 202 comprises a second negative electrode base layer 2021 and a second negative electrode conductive carbon layer 2022, and the second negative electrode conductive carbon layer 2022 is disposed on at least one of two opposite surfaces of the second negative electrode base layer 2021.

Figure 15:
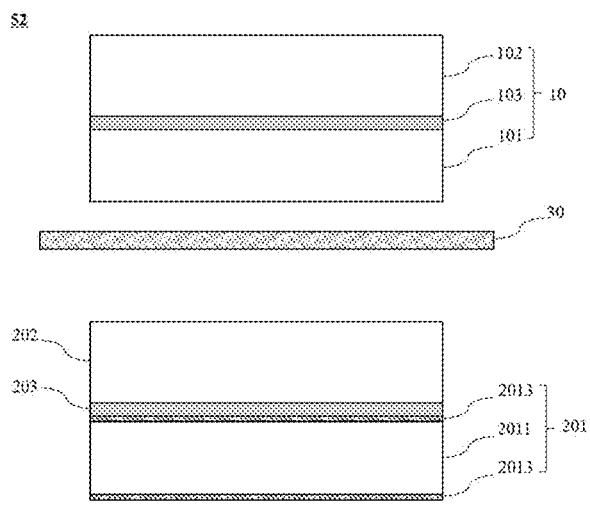
FIG. 15 is a schematic structural diagram of an electrode assembly according to another embodiment of the present disclosure.

(n) As shown in FIG. 15, the first negative electrode film layer 201 comprises a first negative electrode base layer 2011 and a first negative electrode ceramic layer 2013, and the first negative electrode ceramic layer 2013 is disposed on at least one of two opposite surfaces of the first negative electrode base layer 2011. Optionally, the first negative electrode ceramic layer 2013 comprises one or more of alumina ceramics, silicon nitride ceramics, silicon carbide ceramics, and boron nitride ceramics.

Figure 16:
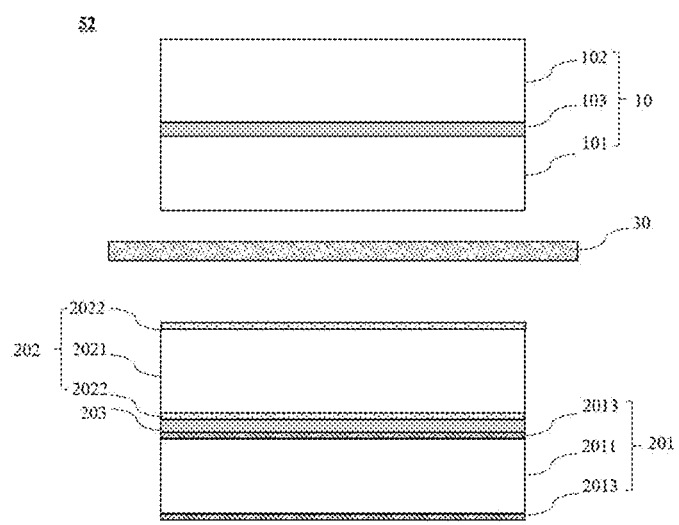
FIG. 16 is a schematic structural diagram of an electrode assembly according to another embodiment of the present disclosure.

It can be understood that although the second negative electrode conductive carbon layer 2022 is disposed on two opposite surfaces of the second negative electrode base layer 2021 as shown in FIG. 14, in other embodiments, the second negative electrode conductive carbon layer 2022 may also be disposed on one of two opposite surfaces of the second negative electrode base layer 2021. Although the first negative electrode ceramic layer 2013 is disposed on two opposite surfaces of the first negative electrode base layer 2011 as shown in FIG. 15, in other embodiments, the first negative electrode ceramic layer 2013 may also be disposed on one of two opposite surfaces of the first negative electrode base layer 2011. As shown in FIG. 16, the negative electrode plate 20 may satisfy the above (m) and (n) both, so that resistance $R_4$ of the second negative electrode film layer 202 is smaller than resistance $R_3$ of the first negative electrode film layer 201.

In some embodiments, the positive electrode current collector may be used in the form of a metal foil or a composite current collector. As an example of the metal foil, aluminum foil can be used as the positive electrode current collector. The composite current collector may comprise a polymer material base layer and a metal material layer formed on at least one surface of the polymer material base layer. As an example, the metal material may be one or more selected from aluminum, aluminum alloy, nickel, nickel alloy, titanium, titanium alloy, silver, and silver alloy. As an example, the polymer material base layer may be selected from polypropylene (PP), polyethylene terephthalate (PET), polybutylene terephthalate (PBT), polystyrene (PS), polyethylene (PE) and the like.

In some embodiments, the first positive electrode active material and the second positive electrode active material may adopt positive electrode active materials known in the art for secondary batteries. As an example, the first positive active material and the second positive active material each independently comprise one or more of lithium transition metal oxides, olivine-structured lithium-containing phosphates, and their respective modified compounds. Examples of lithium transition metal oxides may include, but are not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide and their respective modified compounds. Examples of olivine-structured lithium-containing phosphates may include, but are not limited to, one or more of lithium iron phosphate, composites of lithium iron phosphate with carbon, lithium manganese phosphate, composites of lithium manganese phosphate with carbon, lithium iron manganese phosphate, composites of lithium iron manganese phosphate with carbon and their respective modified compounds. The present disclosure is not limited to these materials, and other conventionally known materials that can be used as positive electrode active materials for secondary batteries can also be used. These positive electrode active materials may be used alone or in combination of two or more.

In some embodiments, the above-mentioned modified compounds of each positive electrode active material can be made by modifying the positive electrode active material with the following modification including doping, surface coating, or doping and surface coating simultaneously.

In some embodiments, in order to further improve energy density of the secondary battery, the first positive electrode active material and the second positive electrode active material can also independently include one or more of the lithium transition metal oxide as shown in formula 1 and its modified compounds.

$$Li_aNi_bCo_cM_dO_eA_f \qquad \text{Formula 1}$$

In Formula 1, $0.8 \leq a \leq 1.2$, $0.5 \leq b < 1$, $0 < c < 1$, $0 < d < 1$, $1 \leq e \leq 2$, $0 \leq f \leq 1$, M is one or more selected from Mn, Al, Zr, Zn, Cu, Cr, Mg, Fe, V, Ti and B, and A is one or more selected from N, F, S and Cl.

In some embodiments, as an example, the first positive electrode binder and the second positive electrode binder each independently comprise one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, as an example, the first positive electrode conductive agent and the second positive electrode conductive agent each independently comprise one or more of superconducting carbon, conductive graphite (e.g., KS-6), acetylene black, carbon black (e.g., Super P), Ketjen black, carbon dots, carbon nanotubes (CNT), graphene, and carbon nanofibers.

In some embodiments, the first positive electrode film layer and the second positive electrode film layer are usually formed by applying a positive electrode slurry on the positive electrode current collector, drying and cold pressing. The positive electrode slurry is usually formed by dispersing a positive electrode active material, a positive electrode conductive agent, a positive electrode binder and any other components in a solvent with stirring uniformly. The solvent may be N-methylpyrrolidone (NMP), but is not limited thereto.

In some embodiments, the negative electrode current collector can be used in the form of a metal foil or a composite current collector. As an example of the metal foil, a copper foil can be used. The composite current collector may comprise a polymer material base layer and a metal material layer formed on at least one surface of the polymer material base layer. As an example, the metal material may be one or more selected from copper, copper alloy, nickel, nickel alloy, titanium, titanium alloy, silver, and silver alloy. As an example, the polymer material base layer may be selected from polypropylene (PP), polyethylene terephthalate (PET), polybutylene terephthalate (PBT), polystyrene (PS), polyethylene (PE) and the like.

In some embodiments, the first negative electrode active material and the second negative electrode active material may adopt negative electrode active materials known in the art for secondary batteries. As an example, the first negative active material and the second negative active material each independently comprise one or more of artificial graphite, natural graphite, soft carbon, hard carbon, silicon-based material, tin-based material, and lithium titanate. The silicon-based material can be one or more selected from elemental silicon, silicon-oxygen compounds, silicon-carbon composites, silicon-nitrogen composites and silicon alloys. The tin-based material can be one or more selected from elemental tin, tin oxide compounds and tin alloys. However, the present disclosure is not limited to these materials, and other conventionally known materials that can be used as negative electrode active materials for secondary batteries can also be used. These negative electrode active materials may be used alone or in combination of two or more.

In some embodiments, as an example, the first negative binder and the second negative binder independently comprise one or more of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, as an example, the first negative electrode conductive agent and the second negative electrode conductive agent each independently comprise one or more of superconducting carbon, conductive graphite (e.g., KS-6), acetylene black, carbon black (e.g., Super P), Ketjen black, carbon dots, carbon nanotubes (CNT), graphene and carbon nanofibers.

In some embodiments, the first negative film layer and the second negative film layer may optionally comprise other additives, for example thickeners (such as sodium carboxymethyl cellulose CMC-Na).

In some embodiments, the first negative electrode film layer and the second negative electrode film layer are usually formed by applying a negative electrode slurry on the negative electrode current collector, drying and cold pressing. The negative electrode slurry is usually formed by dispersing a negative electrode active material, a negative electrode conductive agent, a negative electrode binder and any other components in a solvent with stirring uniformly. The solvent may be deionized water, but is not limited thereto.

[Electrolyte]

Electrolyte functions as conducting active ions between the positive electrode plate and the negative electrode plate. In the secondary battery of the present disclosure, the type of electrolyte is not specifically limited, which can be selected according to requirements. For example, the electrolyte may be at least one selected from solid electrolytes and liquid electrolytes (i.e., electrolytic solution).

In some embodiments, the electrolyte is used in the form of an electrolytic solution. The electrolytic solution comprises an electrolyte salt and a solvent.

In some embodiments, the type of electrolyte salt is not specifically limited, and can be selected according to actual needs. As an example, the electrolyte salt may be one or more selected from lithium hexafluorophosphate $LiPF_6$, lithium tetrafluoroborate $LiBF_4$, lithium perchlorate $LiClO_4$, lithium hexafluoroarsenate $LiAsF_6$, lithium bisfluorosulfonimide LiFSI, lithium bistrifluoromethanesulfonimide LiTFSI, lithium trifluoromethanesulfonate LiTFS, lithium difluorooxalate borate LiDFOB, lithium dioxalate borate LiBOB, lithium difluorophosphate $LiPO_2F_2$, lithium difluorobisoxalate phosphate LiDFOP and lithium tetrafluorooxalate phosphate LiTFOP.

In some embodiments, the type of solvent is not specifically limited, and can be selected according to actual needs. As an example, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA)), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, the solvent is a non-aqueous solvent.

In some embodiments, the electrolytic solution may optionally comprise additives. For example, the additives may include negative electrode film-forming additives, positive electrode film-forming additives, and may further include those additives that can improve certain performance of batteries, such as those additives to improve battery overcharge performance, those additives to improve battery high temperature performance, and those additives to improve battery low temperature performance and the like.

[Separator]

In secondary batteries using an electrolytic solution and some secondary batteries using a solid electrolyte, a separator is also included. The separator is arranged between the positive electrode plate and the negative electrode plate, which mainly functions as preventing short circuit of the positive and negative electrodes while allowing active ions to pass through. There is no particular limitation on the type of separator in the present disclosure, and any well-known porous-structure separator with good chemical stability and mechanical stability can be selected.

In some embodiments, materials of the separator can be one or more selected from glass fibers, non-woven fabrics, polyethylene, polypropylene and polyvinylidene fluoride. The separator can be a single-layer film or a multi-layer composite film. When the separator is a multi-layer composite film, materials of each layer can be the same or different.

[Method for Preparing Electrode Assembly]

The present disclosure also provides a method for preparing an electrode assembly, and the method may comprise the steps of:

S10, a first positive electrode active material, a first positive electrode conductive agent, a first positive electrode binder are dispersed in a solvent and stirred homogeneously to form a first positive electrode slurry, a second positive electrode active material, a second positive electrode conductive agent, a second positive electrode binder are dispersed in a solvent and stirred homogeneously to form a second positive electrode slurry, the first positive electrode slurry and the second positive electrode slurry are respectively applied on opposite surfaces of a positive electrode current collector, and dried and cold pressed to obtain a positive electrode plate, wherein a first positive electrode film layer and a second positive electrode film layer are formed from the first positive electrode slurry and the second positive electrode slurry form respectively;

S20, a first negative electrode active material, a first negative electrode conductive agent, a first negative electrode binder are dispersed in a solvent and stirred homogeneously to form a first negative electrode slurry, a second negative electrode active material, a second negative electrode conductive agent, a second negative electrode binder are dispersed in a solvent and stirred homogeneously to form a second negative electrode slurry, the first negative electrode slurry and the second negative electrode slurry are respectively applied on opposite surfaces of a negative electrode current collector, and dried and cold pressed to obtain a negative electrode plate, wherein a first negative electrode film layer and a second negative electrode film layer are formed from the first negative electrode slurry and the second negative electrode slurry form respectively;

S30, the positive electrode plate, separator and negative electrode plate are assembled into an electrode assembly, wherein the first positive film layer is located on the side of the positive current collector close to the separator and the second negative film layer is located on the side of the negative current collector close to the separator, alternatively, the first positive electrode film layer is located on the side of the positive electrode collector away from the separator and the second negative electrode layer is located on the side of the negative electrode collector away from the separator;

S40, the electrode assembly is detected, and the electrode assembly satisfying both $0<CAP1/CAP2<1$ and $R_4/R_3-R_2/R_1 \geq 0$ is sorted out, wherein CAP1 represents capacity of the first positive electrode film layer in Ah, CAP2 represents capacity of the second positive electrode film layer in Ah, $R_1$ represents resistance of the first positive electrode film layer in $\Omega$, $R_2$ represents resistance of the second positive electrode film layer in $\Omega$, $R_3$ represents resistance of the first negative electrode film layer in m$\Omega$, and $R_4$ represents resistance of the second negative electrode film layer in m$\Omega$.

The electrode assemblies obtained by the method of the present disclosure can greatly extend cycle life of secondary batteries.

In some embodiments, as an example, the positive electrode plate, the separator, and the negative electrode plate may be formed into an electrode assembly through a winding process or a lamination process.

In some embodiments, in step S40, optionally, an electrode assembly satisfying both $0.33 \leq CAP1/CAP2<1$ and $0 \leq R_4/R_3-R_2/R_1 \leq 20$ is sorted out.

In some embodiments, in step S40, optionally, an electrode assembly satisfying both $0.5 \leq CAP1/CAP2<1$ and $0<R_4/R_3-R_2/R_1 \leq 20$ is sorted out.

In some embodiments, in step S40, optionally, an electrode assembly satisfying both $0.5 \leq CAP1/CAP2 \leq 0.9$ and $0.1 \leq R_4/R_3-R_2/R_1 \leq 2$ is sorted out.

In some embodiments, the method further includes the following step of: S50, sorting out further electrode assemblies that satisfy $1 \leq R_4/R_3 \leq 30$ and $0<R_2/R_1 \leq 20$ both.

In some embodiments, the method further includes the following step of: S50, sorting out further electrode assemblies that satisfy $0<R_4/R_3<1$ and $0<R_2/R_1<1$ both.

In some embodiments, the method further includes the following step of: S50, sorting out further electrode assemblies that satisfy both $R_4/R_3=1$ and $R_2/R_1=1$.

Battery Module and Battery Pack

In some embodiments of the present disclosure, the secondary battery according to the present disclosure can be assembled into a battery module, the number of secondary batteries contained in the battery module can be multiple, and the specific number can be adjusted according to the disclosure and capacity of the battery module.

Figure 17:
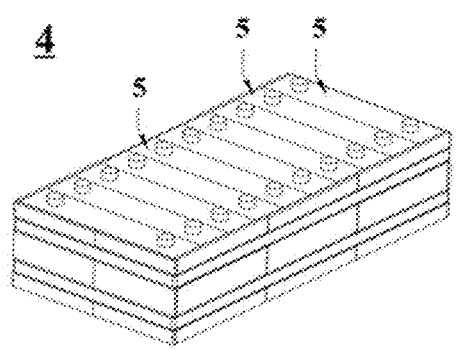
FIG. 17 is a schematic diagram of a battery module according to an embodiment of the present disclosure.

FIG. 17 is a schematic diagram of the battery module 4 as an example. As shown in FIG. 17, in the battery module 4, a plurality of secondary batteries 5 may be arranged in sequence along the longitudinal direction of the battery module 4. Of course, they can also be arranged in any other manner. Furthermore, a plurality of secondary batteries 5 can be fixed with fasteners.

Optionally, the battery module 4 may further include a housing having an accommodating space in which a plurality of secondary batteries 5 are accommodated.

In some embodiments of the present disclosure, the above-mentioned battery modules can also be assembled into a battery pack, and the number of battery modules included in the battery pack can be adjusted according to the disclosure and capacity of the battery pack.

Figure 18:
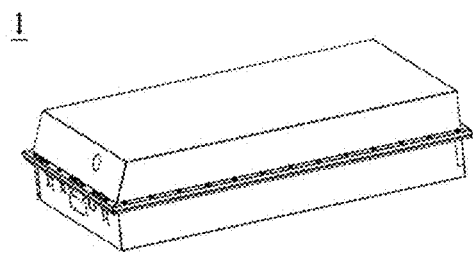
FIG. 18 is a schematic diagram of a battery pack according to an embodiment of the present disclosure.
Figure 19:
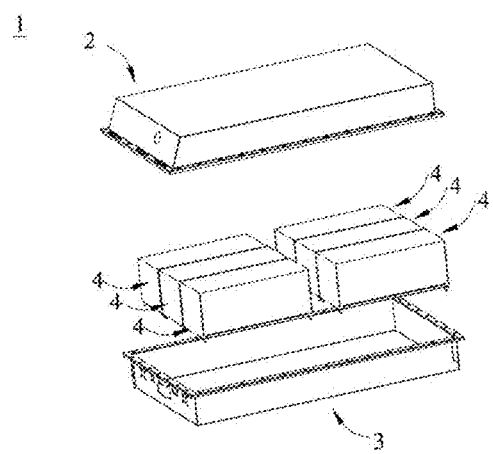
FIG. 19 is an exploded view of the battery pack according to an embodiment of the present disclosure as shown in FIG. 18.

FIGS. 18 and 19 are schematic diagrams of the battery pack 1 as an example. As shown in FIGS. 18 and 19, the battery pack 1 may include a battery case and a plurality of battery modules 4 provided in the battery case. The battery box includes an upper case body 2 and a lower case body 3, and the upper case body 2 is used to cover the lower case body 3 to form a closed space for accommodating the battery modules 4. A plurality of battery modules 4 may be arranged in the battery case in any manner.

Electrical Device

Embodiments of the present disclosure also provide an electrical device comprising at least one of the secondary battery, battery module, and battery pack of the present disclosure. The secondary battery, battery module or battery pack can be used as a power source of the electrical device, and can also be used as an energy storage unit of the electrical device. The electrical device can be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The electrical device can select a secondary battery, a battery module or a battery pack according to its usage requirements.

Figure 20:
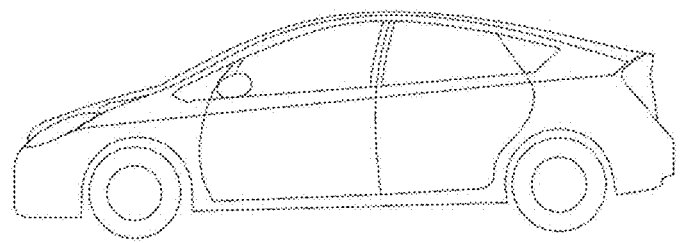
FIG. 20 is a schematic diagram of an electrical device according to an embodiment of the present disclosure using the secondary battery of the present disclosure as power.

FIG. 20 is a schematic diagrams of an electrical device as an example. The electrical device is a pure electric vehicle, a hybrid electric vehicle, or a plug-in hybrid electric vehicle. In order to meet high power and high energy density requirements of the electrical device, a battery pack or a battery module can be used.

As another example, the electrical device may be a mobile phone, a tablet computer, a notebook computer, and the like. The electric device is generally required to be light and thin, and a secondary battery can be used as a power source.

EXAMPLES

The following examples more specifically describe the content disclosed in the present disclosure, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

The structure of the secondary battery is shown in FIG. 3.
The Preparation of Positive Electrode Plate
The positive active material $LiNi_{0.5}Co_{0.2}Mn_{0.3}O_2$, the binder PVDF, the conductive agent Super P were mixed in an appropriate amount of solvent NMP at a weight ratio of 96.2:1.1:2.7 with fully stirring, thereby obtaining a first positive electrode slurry, and the first positive electrode slurry was applied on the side of a positive electrode current collector aluminum foil close to separator.
The positive active material $LiNi_{0.5}Co_{0.2}Mn_{0.3}O_2$, the binder PVDF, the conductive agent Super P were mixed in an appropriate amount of solvent NMP at a weight ratio of 96.2:1.1:2.7 with fully stirring, thereby obtaining a second positive electrode slurry, and the second positive electrode slurry was applied on the side of a positive electrode current collector aluminum foil away from separator.
in which, the ratio of the coating weight of the first positive electrode slurry and of the second positive electrode slurry was 0.76:1, and then the first positive electrode slurry was dried and cold pressed to form a first positive electrode film layer, and the second positive electrode slurry was dried and cold pressed to form a second positive electrode film layer.
The Preparation of Negative Electrode Plate
The negative active material graphite with a conductive carbon layer, the conductive agent Super P, the thickener CMC-Na, and the binder SBR were mixed in an appropriate amount of solvent deionized water at a weight ratio of 97:1:0.5:1.5 with fully stirring, thereby obtaining a first negative electrode slurry, and the first negative electrode slurry was applied on the side of a negative electrode current collector copper foil away from separator.
The negative active material graphite, the conductive agent Super P, the thickener CMC-Na, and the binder SBR were mixed in an appropriate amount of solvent deionized water at a weight ratio of 97:1:0.5:1.5 with fully stirring, thereby obtaining a second negative electrode slurry, and the second negative electrode slurry was applied on the side of a negative electrode current collector copper foil close to separator.
in which, the coating weights of the first negative electrode slurry and of the second negative electrode slurry were the same, and then the first negative electrode slurry was dried and cold pressed to form a first negative electrode film layer, and the second negative electrode slurry was dried and cold pressed to form a second negative electrode film layer.
Separator
A porous polyethylene film was used as the separator.
The Preparation of Electrolytic Solution
Ethylene carbonate (EC), ethyl methyl carbonate (EMC), diethyl carbonate (DEC) were mixed at a volume ratio of 1:1:1 to obtain an organic solvent; and $LiPF_6$ was uniformly dissolved in above-mentioned organic solvent to obtain the electrolytic solution, wherein the concentration of $LiPF_6$ was 1 mol/L.

The Preparation of Secondary Battery
The positive electrode plate, separator, negative electrode plate as prepared above were stacked and wound in order to obtain an electrode assembly; the electrode assembly was put into an outer package, to which above-mentioned electrolyte was added. Through encapsulation, standing, formation, and capacity testing, the secondary battery was obtained. The formation process was as follows: the secondary battery was charged to 3.0V with a constant current of 0.1C, and then charged to 3.75V with a constant current of 0.2C. The capacity testing was as follows: the secondary battery was charged to 4.4V with a constant current of 0.33C, and then charged to 0.05C with a constant voltage; the secondary battery was discharged to 2.5V with a constant current of 0.33C, and then charged to 3.65V with a constant current of 0.33C, and then charged to 0.05C with a constant voltage.

Example 2

The preparation method of the secondary battery was similar to that of Example 1, except that the compaction density of the first negative electrode film layer was increased.

Example 3

The preparation method of secondary battery was similar to Example 1, except that the relevant parameters in the preparation of negative electrode plate were adjusted.
The negative electrode active material graphite, conductive agent Super P, thickener CMC-Na, and binder SBR were mixed at a weight ratio of 96.6:1.4:0.5:1.5 in an appropriate amount of solvent deionized water with fully stirring, thereby obtaining the first negative electrode slurry.

Example 4

The preparation method of secondary battery was similar to Example 1, except that: the relevant parameters in the preparation of negative electrode plate were adjusted.
The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining the first negative electrode slurry, the first negative electrode slurry was applied on the side of the negative electrode current collector copper foil away from separator, and the side of the negative electrode current collector away from separator was also coated with a conductive carbon layer with a thickness of 0.5 μm Example 5

The preparation method of secondary battery was similar to Example 1, except that: the relevant parameters in the preparation of negative electrode plate were adjusted.
The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining the first negative electrode slurry, and the first negative electrode slurry was applied on the side of the negative electrode current collector copper foil away from separator.
The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining the second negative electrode slurry, the second negative electrode slurry was applied on the side of the negative electrode current collector copper foil close to the separator, and the side of the negative electrode current collector close to the separator was also coated with an alumina ceramic layer with a thickness of 0.5 µm.

Example 6

The preparation method of secondary battery was similar to Example 1, except that: the relevant parameters in the preparation of negative electrode plate were adjusted.

The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining the second negative electrode slurry, the second negative electrode slurry was applied on the side of the negative electrode current collector copper foil close to the separator, and the side of the negative electrode current collector close to the separator was also coated with an alumina ceramic layer with a thickness of 0.5 µm.

Example 7

The preparation method of secondary battery was similar to Example 1, except that: the relevant parameters in the preparation of negative electrode plate were adjusted.

The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining the first negative electrode slurry, and the first negative electrode slurry was applied on the side of the negative electrode current collector copper foil away from separator.

The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining the second negative electrode slurry, the second negative electrode slurry was applied on the side of the negative electrode current collector copper foil close to the separator, and the side of the negative electrode current collector close to the separator was also coated with an alumina ceramic layer with a thickness of 1.2 µm.

Example 8

The preparation method of secondary battery was similar to Example 1, except that: the relevant parameters in the preparation of negative electrode plate were adjusted.

The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining the second negative electrode slurry, the second negative electrode slurry was applied on the side of the negative electrode current collector copper foil close to the separator, and the side of the negative electrode current collector close to the separator was coated with an alumina ceramic layer with a thickness of 1.2 µm.

Example 9

The preparation method of secondary battery was similar to Example 1, except that: the relevant parameters in the preparation of negative electrode plate were adjusted.

The negative electrode active material graphite, conductive agent Super P, thickener CMC-Na, binder SBR were mixed at a weight ratio of 96.6:1.4:0.5:1.5 in an appropriate amount of solvent deionized water with fully stirring, thereby obtaining the first negative electrode slurry.

The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining the second negative electrode slurry, the second negative electrode slurry was applied on the side of the negative electrode current collector copper foil close to the separator, and the side of the negative electrode current collector close to the separator was also coated with an alumina ceramic layer with a thickness of 1.5 µm.

Example 10

The preparation method of secondary battery was similar to Example 1, except that: the relevant parameters in the preparation of negative electrode plate were adjusted.

The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining the second negative electrode slurry, the second negative electrode slurry was applied on the side of the negative electrode current collector copper foil close to the separator, and the side of the negative electrode current collector close to the separator was also coated with an alumina ceramic layer with a thickness of 2 µm.

Example 11

The preparation method of secondary battery was similar to Example 1, except that: the relevant parameters in the preparation of negative electrode plate were adjusted.

The side of the negative electrode current collector away from separator was also coated with a conductive carbon layer with a thickness of 2 µm and the side of the negative electrode current collector close to separator was also coated with an alumina ceramic layer with a thickness of 2 µm.

Example 12

The preparation method of secondary battery was similar to Example 1, except that: the relevant parameters in the preparation of negative electrode plate were adjusted.

The side of the negative electrode current collector away from separator was also coated with a conductive carbon layer with a thickness of 2 µm and the side of the negative electrode current collector close to separator was also coated with an alumina ceramic layer with a thickness of 4 µm.

Example 13

The preparation method of secondary battery was similar to Example 1, except that: the relevant parameters in the preparation of negative electrode plate and positive electrode plate were adjusted.

The ratio of coating weights of the first positive electrode slurry and of the second positive electrode slurry was 0.6:1 and the side of the positive electrode current collector away from separator was also coated with an alumina ceramic layer with a thickness of 2 µm.

The side of the negative electrode current collector away from separator was also coated with a conductive carbon layer with a thickness of 2 μm and the side of the negative electrode current collector close to separator was also coated with an alumina ceramic layer with a thickness of 6 μm.

Example 14

The preparation method of secondary battery was similar to Example 1, except that: the relevant parameters in the preparation of negative electrode plate were adjusted.

The side of the negative electrode current collector away from separator was also coated with a conductive carbon layer with a thickness of 2 μm and the side of the negative electrode current collector close to separator was also coated with an alumina ceramic layer with a thickness of 6 μm.

Example 15

The preparation method of secondary battery was similar to Example 1, except that: the relevant parameters in the preparation of negative electrode plate and positive electrode plate were adjusted.

The positive active material $LiNi_{0.5}Co_{0.2}Mn_{0.3}O_2$, the binder PVDF, the conductive agent Super P were mixed in an appropriate amount of solvent NMP at a weight ratio of 96.2:1.1:2.7 with fully stirring, thereby obtaining a first positive electrode slurry. The positive active material $LiNi_{0.5}Co_{0.2}Mn_{0.3}O_2$, the binder PVDF, the conductive agent Super P were mixed in an appropriate amount of solvent NMP at a weight ratio of 96.2:1.1:2.7 with fully stirring, thereby obtaining a second positive electrode slurry. The ratio of the coating weights of the first positive electrode slurry and of the second positive electrode slurry was 0.84:1, The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining the first negative electrode slurry and the first negative electrode slurry was applied on the side of the negative electrode current collector copper foil away from separator.

The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining the second negative electrode slurry, the second negative electrode slurry was applied on the side of the negative electrode current collector copper foil close to separator, and the side of the negative electrode current collector close to separator was also coated with an alumina ceramic layer with a thickness of 0.5 μm.

Example 16

The preparation method of secondary battery was similar to Example 1, except that: the relevant parameters in the preparation of negative electrode plate were adjusted.

The negative electrode active material graphite with a conductive carbon layer, conductive agent Super P, thickener CMC-Na, binder SBR were mixed at a weight ratio of 97:1:0.5:1.5 in an appropriate amount of solvent deionized water with fully stirring, thereby obtaining the first negative electrode slurry.

Example 17

The preparation method of secondary battery was similar to Example 1, except that: the relevant parameters in the preparation of negative electrode plate and positive electrode plate were adjusted.

The positive active material $LiNi_{0.5}Co_{0.2}Mn_{0.3}O_2$, the binder PVDF, the conductive agent Super P were mixed in an appropriate amount of solvent NMP at a weight ratio of 96.2:1.2:2.6 with fully stirring, thereby obtaining a first positive electrode slurry. The positive active material $LiNi_{0.5}Co_{0.2}Mn_{0.3}O_2$, the binder PVDF, the conductive agent Super P were mixed in an appropriate amount of solvent NMP at a weight ratio of 96.2:1.1:2.7 with fully stirring, thereby obtaining a second positive electrode slurry. The ratio of the coating weights of the first positive electrode slurry and of the second positive electrode slurry was 0.84:1, The negative electrode active material graphite with a conductive carbon layer, conductive agent Super P, thickener CMC-Na, binder SBR were mixed at a weight ratio of 97.05:0.95:0.5:1.5 in an appropriate amount of solvent deionized water with fully stirring, thereby obtaining the first negative electrode slurry. The negative electrode active material graphite with a conductive carbon layer, conductive agent Super P, thickener CMC-Na, binder SBR were mixed at a weight ratio of 97:1:0.5:1.5 in an appropriate amount of solvent deionized water with fully stirring, thereby obtaining the second negative electrode slurry.

Example 18

The preparation method of secondary battery was similar to Example 1, except that: the relevant parameters in the preparation of negative electrode plate and positive electrode plate were adjusted.

The positive active material $LiNi_{0.5}Co_{0.2}Mn_{0.3}O_2$, the binder PVDF, the conductive agent Super P were mixed in an appropriate amount of solvent NMP at a weight ratio of 96.2:1.2:2.6 with fully stirring, thereby obtaining a first positive electrode slurry. The positive active material $LiNi_{0.5}Co_{0.2}Mn_{0.3}O_2$, the binder PVDF, the conductive agent Super P were mixed in an appropriate amount of solvent NMP at a weight ratio of 96.2:1.1:2.7 with fully stirring, thereby obtaining a second positive electrode slurry. The ratio of the coating weights of the first positive electrode slurry and of the second positive electrode slurry was 0.84:1, The negative electrode active material graphite with a conductive carbon layer, conductive agent Super P, thickener CMC-Na, binder SBR were mixed at a weight ratio of 97:1:0.5:1.5 in an appropriate amount of solvent deionized water with fully stirring, thereby obtaining the first negative electrode slurry. The negative electrode active material graphite with a conductive carbon layer, conductive agent Super P, thickener CMC-Na, binder SBR were mixed at a weight ratio of 97:1:0.5:1.5 in an appropriate amount of solvent deionized water with fully stirring, thereby obtaining the second negative electrode slurry.

Example 19

The preparation method of secondary battery was similar to Example 1, except that: the relevant parameters in the preparation of negative electrode plate and positive electrode plate were adjusted.

The ratio of the coating weights of the first positive electrode slurry and of the second positive electrode slurry was 0.84:1, and the side of the positive electrode current collector close to separator was also coated with an alumina ceramic layer with a thickness of 2 μm.

The negative electrode active material graphite with a conductive carbon layer, conductive agent Super P, thickener CMC-Na, binder SBR were mixed at a weight ratio of 97.05:0.95:0.5:1.5 in an appropriate amount of solvent deionized water with fully stirring, thereby obtaining the first negative electrode slurry.

The negative electrode active material graphite with a conductive carbon layer, conductive agent Super P, thickener CMC-Na, binder SBR were mixed at a weight ratio of 97:1:0.5:1.5 in an appropriate amount of solvent deionized water with fully stirring, thereby obtaining the second negative electrode slurry.

Example 20

The preparation method of secondary battery was similar to Example 1, except that: the relevant parameters in the preparation of negative electrode plate and positive electrode plate were adjusted.

The ratio of the coating weights of the first positive electrode slurry and of the second positive electrode slurry was 0.84:1, and the side of the positive electrode current collector close to separator was also coated with an alumina ceramic layer with a thickness of 1 μm.

The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining the first negative electrode slurry. The negative electrode active material graphite with a conductive carbon layer, conductive agent Super P, thickener CMC-Na, binder SBR were mixed at a weight ratio of 96.95:1:1.05:0.5:1.5 in an appropriate amount of solvent deionized water with fully stirring, thereby obtaining the second negative electrode slurry.

Example 21

The preparation method of secondary battery was similar to Example 1, except that: the relevant parameters in the preparation of negative electrode plate and positive electrode plate were adjusted.

The positive active material $LiNi_{0.5}Co_{0.2}Mn_{0.3}O_2$, the binder PVDF, the conductive agent Super P were mixed in an appropriate amount of solvent NMP at a weight ratio of 96.2:1.1:2.7 with fully stirring, thereby obtaining a first positive electrode slurry. The first positive electrode slurry was applied on the side of the positive electrode current collector aluminum foil close to separator and the side of the positive electrode current collector close to separator was also coated with an alumina ceramic layer with a thickness of 1 μm. The positive active material $LiNi_{0.5}Co_{0.2}Mn_{0.3}O_2$, the binder PVDF, the conductive agent Super P were mixed in an appropriate amount of solvent NMP at a weight ratio of 96.2:1.3:2.5 with fully stirring, thereby obtaining a second positive electrode slurry. The second positive electrode slurry was applied on the side of the positive electrode current collector aluminum foil away from separator. The ratio of the coating weights of the first positive electrode slurry and of the second positive electrode slurry was 0.84:1.

The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining a first negative electrode slurry. The first negative electrode slurry is applied on the side of the negative electrode current collector copper foil away from the separator, and the side of the negative electrode current collector away from separator is also coated with an alumina ceramic layer with a thickness of 0.5 μm. The negative electrode active material graphite with a conductive carbon layer, conductive agent Super P, thickener CMC-Na, binder SBR were mixed at a weight ratio of 97:1:0.5:1.5 in an appropriate amount of solvent deionized water with fully stirring, thereby obtaining a second negative electrode slurry.

Example 22

The preparation method of secondary battery was similar to Example 1, except that: the relevant parameters in the preparation of negative electrode plate and positive electrode plate were adjusted.

The ratio of the coating weights of the first positive electrode slurry and of the second positive electrode slurry was 0.84:1 and the side of the positive electrode current collector close to separator was also coated with an alumina ceramic layer with a thickness of 2 μm.

The negative electrode active material graphite with a conducive carbon layer, conductive agent Super P, thickener CMC-Na, binder SBR were mixed at a weight ratio of 97:1:0.5:1.5 in an appropriate amount of solvent deionized water with fully stirring, thereby obtaining a first negative electrode slurry. The negative electrode active material graphite with a conductive carbon layer, conductive agent Super P, thickener CMC-Na, binder SBR were mixed at a weight ratio of 97:1:0.5:1.5 in an appropriate amount of solvent deionized water with fully stirring, thereby obtaining a second negative electrode slurry.

Comparative Example 1

The preparation method of secondary battery was similar to Example 1, except that: the relevant parameters in the preparation of negative electrode plate and positive electrode plate were adjusted.

The coating weights of the first positive electrode slurry and of the second positive electrode slurry was the same.

The negative electrode active material graphite, conductive agent Super P, thickener CMC-Na, binder SBR were mixed at a weight ratio of 97:1:0.5:1.5 in an appropriate amount of solvent deionized water with fully stirring, thereby obtaining a negative electrode slurry. The negative electrode slurry was applied on opposite sides of a negative electrode current collector copper foil and then the negative electrode slurry was dried and cold pressed to form a negative electrode plate in which the coating weights on opposite sides of the negative current collector were the same.

Comparative Example 2

The preparation method of secondary battery was similar to Comparative Example 1, except that: the relevant parameters in the preparation of negative electrode plate were adjusted.

The ratio of the coating weights of the first positive electrode slurry and of the second positive electrode slurry was 0.76:1.

Comparative Example 3

The preparation method of secondary battery was similar to Example 1, except that: the relevant parameters in the preparation of negative electrode plate and positive electrode plate were adjusted.

The positive active material $LiNi_{0.5}Co_{0.2}Mn_{0.3}O_2$, binder PVDF, and conductive agent Super P were mixed in an appropriate amount of solvent NMP at a weight ratio of 96.2:1.1:2.7 with fully stirring, thereby obtaining a first positive electrode slurry. The positive active material $LiNi_{0.5}Co_{0.2}Mn_{0.3}O_2$, binder PVDF, and conductive agent Super P were mixed in an appropriate amount of solvent NMP at a weight ratio of 96.2:1.3:2.5 with fully stirring, thereby obtaining a second positive electrode slurry. The ratio of the coating weights of the first positive electrode slurry and of the second positive electrode slurry was 0.84:1.

The negative electrode active material graphite, conductive agent Super P, thickener CMC-Na, and binder SBR were mixed at a weight ratio of 97:1:0.5:1.5 in an appropriate amount of solvent deionized water with fully stirring, thereby obtaining a first negative electrode slurry. The negative electrode active material graphite with a conductive carbon layer, conductive agent Super P, thickener CMC-Na, and binder SBR were mixed at a weight ratio of 96.95:1.05:0.5:1.5 in an appropriate amount of solvent deionized water with fully stirring, thereby obtaining a second negative electrode slurry.

Test Section (1) Capacity Test of Positive Electrode Film Layers

The cold-pressed positive electrode plate was wiped to remove its second positive electrode film layer and then punched into small wafers with a diameter of 14 mm. The small wafers were assembled into a button battery in a glove box. After that, the button battery was subjected to a charge-discharge process with a blue electricity tester in which it was charged with a constant current of 0.1 mA to a charge cut-off voltage, and it was discharged with a constant current of 0.1 mA to a discharge cut-off voltage to obtain the discharge capacity CAP0. Capacity CAP1 of the first positive electrode film layer was obtained by the formula $CAP0 \times S_1/S_0$, where $S_0$ was area of the small wafers, and $S_1$ was area of the first positive electrode film layer.

The cold-pressed positive electrode plate was wiped to remove its first positive electrode film layer and then punched into small wafers with a diameter of 14 mm. The small wafers were assembled into a button battery in a glove box. After that, the button battery was subjected to a charge-discharge process with a blue electricity tester in which it was charged with a constant current of 0.1 mA to a charge cut-off voltage, and it was discharged with a constant current of 0.1 mA to a discharge cut-off voltage to obtain the discharge capacity CAP0. Capacity CAP2 of the second positive electrode film layer was obtained by the formula $CAP0 \times S_2/S_0$, where $S_0$ was area of the small wafers, and $S_2$ was area of the second positive electrode film layer.

(2) Resistance Test of Each Electrode Film Layer

The cold-pressed positive electrode plate was wiped to remove its second positive electrode film layer and, and disposed in parallel between two conductive terminals of the electrode plate resistance meter with a certain pressure for fixture, to obtain the resistance $R_1$ of the first positive electrode film layer. The cold-pressed positive electrode plate was wiped to remove its first positive electrode film layer and, and disposed in parallel between two conductive terminals of the electrode plate resistance meter with a certain pressure for fixture, to obtain the resistance $R_2$ of the second positive electrode film layer. The cold-pressed negative electrode plate was wiped to remove its second negative electrode film layer and, and disposed in parallel between two conductive terminals of the electrode plate resistance meter with a certain pressure for fixture, to obtain the resistance $R_3$ of the first negative electrode film layer. The cold-pressed negative electrode plate was wiped to remove its first negative electrode film layer and, and disposed in parallel between two conductive terminals of the electrode plate resistance meter with a certain pressure for fixture, to obtain the resistance $R_4$ of the second negative electrode film layer.

The electrode plate resistance meter has a model of IEST BER1000 (from Yuanneng Technology Co., Ltd.), and the conductive terminal has a diameter of 14 mm, and the applied pressure was within 15 Mpa-27 Mpa, and the sampling range was within 10 s to 20 s.

(3) Mass Energy Density Test

At 25° C., the secondary battery was charged to 4.4V with a constant current of 0.33C, and charged with a constant voltage to a current of 0.05C. After the secondary battery was allowed for standing for 5 min, it was discharged to 2.5V with a constant current of 0.33C, thereby obtaining a discharge energy Q.

Mass energy density of the secondary battery (Wh/Kg) =discharge energy Q/mass m of the secondary battery.

(4) Cycle Performance Test

At 25° C., the secondary battery was charged to 4.4V with a constant current of 0.5C, and charged with a constant voltage to a current of 0.05C. At this time, the secondary battery was in a fully charged state, which charge capacity was recorded, i.e. the charge capacity of the first cycle. After the secondary battery was allowed for standing for 5 min, it was discharged to 2.5V with a constant current of 0.5 After standing for 5 minutes, the secondary battery was discharged to 2.5V with a constant current of 0.5C. This was a cyclic charge-discharge process, which discharge capacity was recorded, i.e. the discharge capacity of the first cycle. The secondary battery was subjected to the above cyclic charge-discharge process, and the discharge capacity after each cycle was recorded until the discharge capacity of the secondary battery decays to 80% of the discharge capacity of the first cycle. The number of cycles at this time was used to characterize cycle performance of the secondary battery at a rate of 0.5C. The higher the cycle number of the secondary battery, the better the cycle performance is.

Performance test results of Examples 1-22 and Comparative Example 1-3 were shown in Table 1 and table 2.

TABLE 1

| No. | CAP1 Ah | CAP2 Ah | $R_1$ Ω | $R_2$ Ω | $R_3$ mΩ | $R_4$ mΩ |
|---|---|---|---|---|---|---|
| Example 1 | 22.8 | 30 | 0.27 | 0.30 | 1.00 | 1.32 |
| Example 2 | 22.8 | 30 | 0.27 | 0.30 | 1.05 | 1.32 |
| Example 3 | 22.8 | 30 | 0.27 | 0.30 | 0.94 | 1.32 |
| Example 4 | 22.8 | 30 | 0.27 | 0.30 | 0.98 | 1.32 |
| Example 5 | 22.8 | 30 | 0.27 | 0.30 | 1.32 | 2.12 |
| Example 6 | 22.8 | 30 | 0.27 | 0.30 | 1.00 | 2.12 |
| Example 7 | 22.8 | 30 | 0.27 | 0.30 | 1.32 | 4.12 |
| Example 8 | 22.8 | 30 | 0.27 | 0.30 | 1.00 | 4.12 |
| Example 9 | 22.8 | 30 | 0.27 | 0.30 | 0.94 | 4.80 |
| Example 10 | 22.8 | 30 | 0.27 | 0.30 | 1.00 | 6.12 |
| Example 11 | 22.8 | 30 | 0.27 | 0.30 | 0.55 | 6.12 |
| Example 12 | 22.8 | 30 | 0.27 | 0.30 | 0.55 | 11.70 |
| Example 13 | 18.0 | 30 | 0.30 | 3.00 | 0.55 | 16.50 |
| Example 14 | 22.8 | 30 | 0.27 | 0.30 | 0.55 | 16.50 |
| Example 15 | 25.2 | 30 | 0.33 | 0.30 | 1.32 | 2.12 |
| Example 16 | 22.8 | 30 | 0.27 | 0.30 | 1.19 | 1.32 |
| Example 17 | 25.2 | 30 | 0.33 | 0.30 | 1.11 | 1.00 |
| Example 18 | 25.2 | 30 | 0.33 | 0.30 | 1.00 | 1.00 |
| Example 19 | 25.2 | 30 | 3.00 | 0.30 | 1.11 | 1.00 |
| Example 20 | 25.2 | 30 | 1.50 | 0.30 | 1.32 | 0.93 |
| Example 21 | 25.2 | 30 | 1.50 | 0.45 | 2.12 | 1.00 |
| Example 22 | 25.2 | 30 | 3.00 | 0.30 | 1.00 | 1.00 |
| Comparative | 30.0 | 30 | 0.30 | 0.30 | 1.32 | 1.32 |

TABLE 1-continued

| No. | CAP1 Ah | CAP2 Ah | $R_1$ Ω | $R_2$ Ω | $R_3$ mΩ | $R_4$ mΩ |
|---|---|---|---|---|---|---|
| Example 1 | | | | | | |
| Comparative Example 2 | 22.8 | 30 | 0.27 | 0.30 | 1.32 | 1.32 |
| Comparative Example 3 | 25.2 | 30 | 0.33 | 0.30 | 1.32 | 0.93 |

TABLE 2

| No. | CAP1/ CAP2 | $R_4/R_3$ | $R_2/R_1$ | $R_4/R_3 - R_2/R_1$ | Mass Energy density (Wh/Kg) | Cycle number |
|---|---|---|---|---|---|---|
| Example 1 | 0.76 | 1.32 | 1.11 | 0.21 | 250 | 2750 |
| Example 2 | 0.76 | 1.26 | 1.11 | 0.15 | 235 | 2650 |
| Example 3 | 0.76 | 1.41 | 1.11 | 0.30 | 240 | 2800 |
| Example 4 | 0.76 | 1.35 | 1.11 | 0.24 | 245 | 2750 |
| Example 5 | 0.76 | 1.61 | 1.11 | 0.50 | 245 | 2600 |
| Example 6 | 0.76 | 2.11 | 1.11 | 1 | 245 | 2650 |
| Example 7 | 0.76 | 3.11 | 1.11 | 2 | 241 | 2650 |
| Example 8 | 0.76 | 4.11 | 1.11 | 3 | 241 | 2700 |
| Example 9 | 0.76 | 5.11 | 1.11 | 4 | 237 | 2650 |
| Example 10 | 0.76 | 6.11 | 1.11 | 5 | 234 | 2650 |
| Example 11 | 0.76 | 11.11 | 1.11 | 10 | 230 | 2650 |
| Example 12 | 0.76 | 21.11 | 1.11 | 20 | 225 | 2600 |
| Example 13 | 0.60 | 30 | 10 | 20 | 210 | 2700 |
| Example 14 | 0.76 | 30 | 1.11 | 28.89 | 215 | 2700 |
| Example 15 | 0.84 | 1.61 | 0.90 | 0.71 | 250 | 2750 |
| Example 16 | 0.76 | 1.11 | 1.11 | 0 | 250 | 2400 |
| Example 17 | 0.84 | 0.90 | 0.90 | 0 | 253 | 2400 |
| Example 18 | 0.84 | 1 | 0.90 | 0.10 | 253 | 2750 |
| Example 19 | 0.84 | 0.90 | 0.10 | 0.80 | 250 | 2650 |
| Example 20 | 0.84 | 0.70 | 0.20 | 0.50 | 251 | 2700 |
| Example 21 | 0.84 | 0.47 | 0.30 | 0.17 | 251 | 2650 |
| Example 22 | 0.84 | 1 | 0.10 | 0.90 | 250 | 2700 |
| Comparative Example 1 | 1 | 1 | 1 | 0 | 260 | 2100 |
| Comparative Example 2 | 0.76 | 1.00 | 1.11 | −0.11 | 250 | 2250 |
| Comparative Example 3 | 0.84 | 0.70 | 0.90 | −0.2 | 253 | 2300 |

It can be seen from the test results of table 2 that, by rationally setting the relationship between resistances of two sides of the positive electrode plate and resistances of two sides of the negative electrode plate so as to make the electrode assembly meet $R_4/R_3 - R_2/R_1 \geq 0$, the secondary battery capacity decay can be delayed and the cycle life of the secondary battery will be greatly extended. Further, when the electrode assembly satisfies $0 \leq R_4/R_3 - R_2/R_1 \leq 20$, the secondary battery can have a greatly extended cycle life and high energy density both.

Described above are merely specific embodiments of the present disclosure, but the protection scope of the present disclosure is not limited to this. Any skilled person who is familiar with this art could readily conceive of various equivalent modifications or substitutions within the disclosed technical scope of the present disclosure, and these modifications or substitutions shall fall within the protection scope of the present disclosure. Therefore, the protection scope of the present disclosure shall be subject to the protection scope of the claims.

The invention claimed is:

1. An electrode assembly, comprising
a positive electrode plate comprising a positive electrode current collector and a first positive electrode film layer and a second positive electrode film layer located on two opposite surfaces of the positive electrode current collector,
a negative electrode plate comprising a negative electrode current collector and a first negative electrode film layer and a second negative electrode film layer located on two opposite surfaces of the negative electrode current collector; and
a separator disposed between the positive electrode plate and the negative electrode plate, wherein the first positive electrode film layer is located on a side of the positive electrode current collector close to the separator and the second negative electrode film layer is located on a side of the negative electrode current collector near the separator, wherein
the positive electrode plate satisfies 0<CAP1/CAP2<1, wherein CAP1 represents capacity of the first positive electrode film layer in Ah, CAP2 represents capacity of the second positive electrode film layer in Ah, and
the negative electrode plate satisfies $0 \leq R_4/R_3 \geq 30$, the positive electrode plate satisfies $0 < R_2/R_1 \leq 20$, the electrode assembly satisfies $R_4/R_3 - R_2/R_1 \geq 0$, wherein $R_1$ represents resistance of the first positive electrode film layer in Ω, $R_2$ represents resistance of the second positive electrode film layer in Ω, $R_3$ represents resistance of the first negative electrode film layer in mΩ and $R_4$ represents resistance of the second negative film layer in mΩ,
the second positive electrode film layer comprises a second positive electrode base layer and at least one second positive electrode conductive carbon layer disposed on at least one of two opposite surfaces of the second positive electrode base layer,
the positive electrode plate satisfies $R_2 < R_1$.

2. The electrode assembly of claim 1, wherein the electrode assembly satisfies $0 \leq R_4/R_3 - R_2/R_1 \leq 20$.

3. The electrode assembly of claim 1, wherein the positive electrode plate satisfies $0.33 \leq CAP1/CAP2 < 1$.

4. The electrode assembly of claim 1, wherein $$0\Omega < R_1 \leq 20\Omega,$$

$$0\Omega < R_2 \leq 20\Omega, 0m\Omega < R_3 \leq 200m\Omega, \text{ and/or}$$

$$0m\Omega < R_4 \leq 200m\Omega.$$

5. The electrode assembly of claim 1, wherein the first positive electrode film layer comprises a first positive electrode active material, the second positive electrode film layer comprises a second positive electrode active material, and the positive electrode plate satisfies one or more of the following:
(1) a coating weight of the first positive electrode film layer is less than a coating weight of the second positive electrode film layer,
(2) a gram capacity of the first positive electrode active material is less than a gram capacity of the second positive electrode active material, or
(3) $w_1 < w_2$, in which $w_1$ represents a mass percentage of the first positive electrode active material based on the total mass of the first positive electrode film layer, and $w_2$ represents a mass percentage of the second positive electrode active material based on the total mass of the second positive electrode film layer.

6. The electrode assembly of claim 1, wherein the negative electrode plate satisfies $R_4/R_3 \geq 1$, and the electrode assembly satisfies $0 < R_4/R_3 - R_2/R_1 \leq 20$.

7. The electrode assembly of claim 6, wherein the negative electrode plate satisfies $1 \leq R_4/R_3 \leq 30$.

8. The electrode assembly of claim 1, wherein the negative electrode plate satisfies $0<R_4/R_3<1$, the positive electrode plate satisfies $0<R_2/R_1<1$, and the electrode assembly satisfies $0 \leq R_4/R_3 - R_2/R_1 < 1$.

9. The electrode assembly of claim 8, wherein
the negative electrode plate satisfies $0<R_4/R_3<1$, and
the positive electrode plate satisfies $0.05 \leq R_2/R_1 \leq 0.9$.

10. The electrode assembly of claim 8, wherein
the negative electrode plate satisfies $0.05 \leq R_4/R_3 < 0.9$, and
the positive electrode plate satisfies $0.05 \leq R_2/R_1 \leq 0.9$.

11. The electrode assembly of claim 1, wherein the positive electrode plate satisfies $R_2/R_1=1$, and the negative electrode plate satisfies $R_4/R_3=1$.

12. The electrode assembly of claim 1, wherein,
the first negative electrode film layer comprises a first negative electrode base layer and at least one first negative electrode conductive carbon layer disposed on at least one of two opposite surfaces of the first negative electrode base layer,
the negative electrode plate satisfies $R_3<R_4$.

13. A secondary battery comprising an outer package, an electrolyte, and the electrode assembly according to claim 1.

14. The secondary battery of claim 13, wherein the outer package includes a casing and a cover plate, the casing has an accommodating cavity and an opening, the electrode assembly is accommodated in the accommodating cavity, and the cover plate is used to close the opening of the casing.

15. A battery module comprising the secondary battery according to claim 13.

16. A battery pack, comprising one of the secondary battery according to claim 13.

17. An electrical device comprising at least one of the secondary battery according to claim 13.

18. An electrode assembly comprising
a positive electrode plate comprising a positive electrode current collector and a first positive electrode film layer and a second positive electrode film layer located on two opposite surfaces of the positive electrode current collector,
a negative electrode plate comprising a negative electrode current collector and a first negative electrode film layer and a second negative electrode film layer located on two opposite surfaces of the negative electrode current collector; and
a separator disposed between the positive electrode plate and the negative electrode plate, wherein the first positive electrode film layer is located on a side of the positive electrode current collector close to the separator and the second negative electrode film layer is located on a side of the negative electrode current collector near the separator, wherein the positive electrode plate satisfies $0<CAP1/CAP2<1$, wherein CAP1 represents capacity of the first positive electrode film layer in Ah, CAP2 represents capacity of the second positive electrode film layer in Ah, and the negative electrode plate satisfies $0 \leq R_4/R_3 \leq 30$, the positive electrode plate satisfies $0<R_2/R_1 \leq 20$, the electrode assembly satisfies $R_4/R_3 - R_2/R_1 \geq 0$, wherein $R_1$ represents resistance of the first positive electrode film layer in Ω, $R_2$ represents resistance of the second positive electrode film layer in Ω, $R_3$ represents resistance of the first negative electrode film layer in mΩ and $R_4$ represents resistance of the second negative film layer in mΩ, the first positive electrode film layer comprises a first positive electrode base layer and at least one first positive electrode ceramic layer disposed on at least one of two opposite surfaces of the first positive electrode base layer, the first positive electrode ceramic layer comprises one or more of alumina ceramics, silicon nitride ceramics, silicon carbide ceramics, and boron nitride ceramics, the positive electrode plate satisfies $R_2<R_1$.

19. The electrode assembly of claim 18, wherein,
the second negative electrode film layer comprises a second negative electrode base layer and at least one second negative electrode ceramic layer disposed on at least one of two opposite surfaces of the second negative electrode base layer, the second negative electrode ceramic layer comprises one or more of alumina ceramics, silicon nitride ceramics, silicon carbide ceramics, and boron nitride ceramics,
the negative electrode plate satisfies $R_3<R_4$.

20. The electrode assembly of claim 18, wherein the first positive electrode film layer comprises a first positive electrode active material, the second positive electrode film layer comprises a second positive electrode active material, and the positive electrode plate satisfies one or more of the following:
(1) a coating weight of the first positive electrode film layer is less than a coating weight of the second positive electrode film layer,
(2) a gram capacity of the first positive electrode active material is less than a gram capacity of the second positive electrode active material, or
(3) $w_1<w_2$, in which $w_1$ represents a mass percentage of the first positive electrode active material based on the total mass of the first positive electrode film layer, and $w_2$ represents a mass percentage of the second positive electrode active material based on the total mass of the second positive electrode film layer.

* * * * *